US008200620B2

(12) United States Patent
Akiyama et al.

(10) Patent No.: US 8,200,620 B2
(45) Date of Patent: Jun. 12, 2012

(54) MANAGING SERVICE PROCESSES

(75) Inventors: Kazuhito Akiyama, Machida (JP);
Takeshi Fukuda, Machida (JP);
Yasuhiro Suzuki, Tokyo (JP); Tadashi Tsumura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/391,793

(22) Filed: Feb. 24, 2009

(65) Prior Publication Data

US 2009/0216786 A1 Aug. 27, 2009

(30) Foreign Application Priority Data

Feb. 25, 2008 (JP) .................................. 2008-42992

(51) Int. Cl.
*G06F 7/00* (2006.01)
(52) U.S. Cl. ........................................ 707/609; 705/300
(58) Field of Classification Search ................... 707/609
See application file for complete search history.

(56) References Cited

U.S. PATENT DOCUMENTS

| | | | | |
|---|---|---|---|---|
| 5,165,018 | A | * | 11/1992 | Simor ............................ 709/222 |
| 6,047,260 | A | | 4/2000 | Levinson |
| 7,523,128 | B1 | | 4/2009 | Miller et al. |
| 2004/0215709 | A1 | | 10/2004 | Basani et al. |
| 2005/0187809 | A1 | * | 8/2005 | Falkenhainer ..................... 705/9 |
| 2005/0234931 | A1 | | 10/2005 | Yip et al. |
| 2006/0004875 | A1 | | 1/2006 | Baron et al. |
| 2006/0235732 | A1 | | 10/2006 | Miller et al. |
| 2007/0100712 | A1 | | 5/2007 | Kilpatrick et al. |
| 2007/0100892 | A1 | | 5/2007 | Kephart et al. |
| 2007/0245300 | A1 | | 10/2007 | Chan et al. |
| 2007/0283011 | A1 | | 12/2007 | Rakowski et al. |
| 2008/0005186 | A1 | | 1/2008 | Ayachitula et al. |
| 2008/0263084 | A1 | | 10/2008 | Faihe et al. |
| 2009/0133026 | A1 | | 5/2009 | Aggarwal et al. |
| 2009/0144319 | A1 | | 6/2009 | Panwar et al. |

OTHER PUBLICATIONS

Baker, Ron; Edmiston, Elizabeth; Jeffcoat, Ben; Tai, Ling; "IBM Tivoli Common Data Model: Guide to Best Practices" Redpaper Form No. REDP-4389. Nov. 2007; pp. 2-7; International Business Machines Corporation. USA.

IBM Redbooks Deployment Guide Series, IBM Tivoli Change and Configuration Management Database Configuration Discovery Tracking; Nov. 2006: vol. 1.1: pp. 41-65: International Business Machines Corporation, USA.

Lindquist, "IBM Service Management architecture," 2007, IBM Systems Journal, vol. 46, Issue 3, pp. 423-440.

(Continued)

*Primary Examiner* — Fazlul Quader
(74) *Attorney, Agent, or Firm* — D'Ambrosio & Menon, PLLC

(57) ABSTRACT

Computer systems, methods, and computer program products for managing a service process that includes a plurality of service steps. A repository holds, for each of at least one configuration item, a set of data that represents at least one predetermined attribute of the configuration item and a relation between the configuration item and a second configuration item. The method includes detecting data on a resource for executing at least one of a plurality of service steps of the service process; creating, in response to a particular service process starting, data using a first configuration item model in which the particular service process is defined as a single configuration item; and creating data from the detected data using a second configuration item model in which one or more particular service steps are defined as a single configuration item.

19 Claims, 23 Drawing Sheets

OTHER PUBLICATIONS

Keel, "From a technology-oriented to a service-oriented approach to IT management," 2007, IBM Systems Journal, vol. 46, Issue 3, pp. 549-564.

Kanehira, Yusuke; "Project Management Institute, A Guide to the Project Management Body of Knowledge," 3rd Edition; Nov. 2004; Chapters 3, 4; International Business Machines Corporation, Japan.

USPTO Office Action dated Sep. 6, 2011 for co-pending U.S. Appl. No. 12/415,317.

IBM Redbooks Deployment Guide Series; IBM Tivoli Change and Configuration Management Database Configuration Discovery Tracking; Nov. 2006; vol. 1.1; pp. 41-65; International Business Machines Corporation, USA.

Baker, Ron; Edmiston, Elizabeth; Jeffcoat, Ben; Tai, Ling; "IBM Tivoli Common Data Model: Guide to Best Practices" Redpaper Form No. REDP-4389, Nov. 2007; pp. 2-7; International Business Machines Corporation, USA.

USPTO Final Office Action dated Feb. 16, 2012 for co-pending U.S. Appl. No. 12/415,317.

* cited by examiner

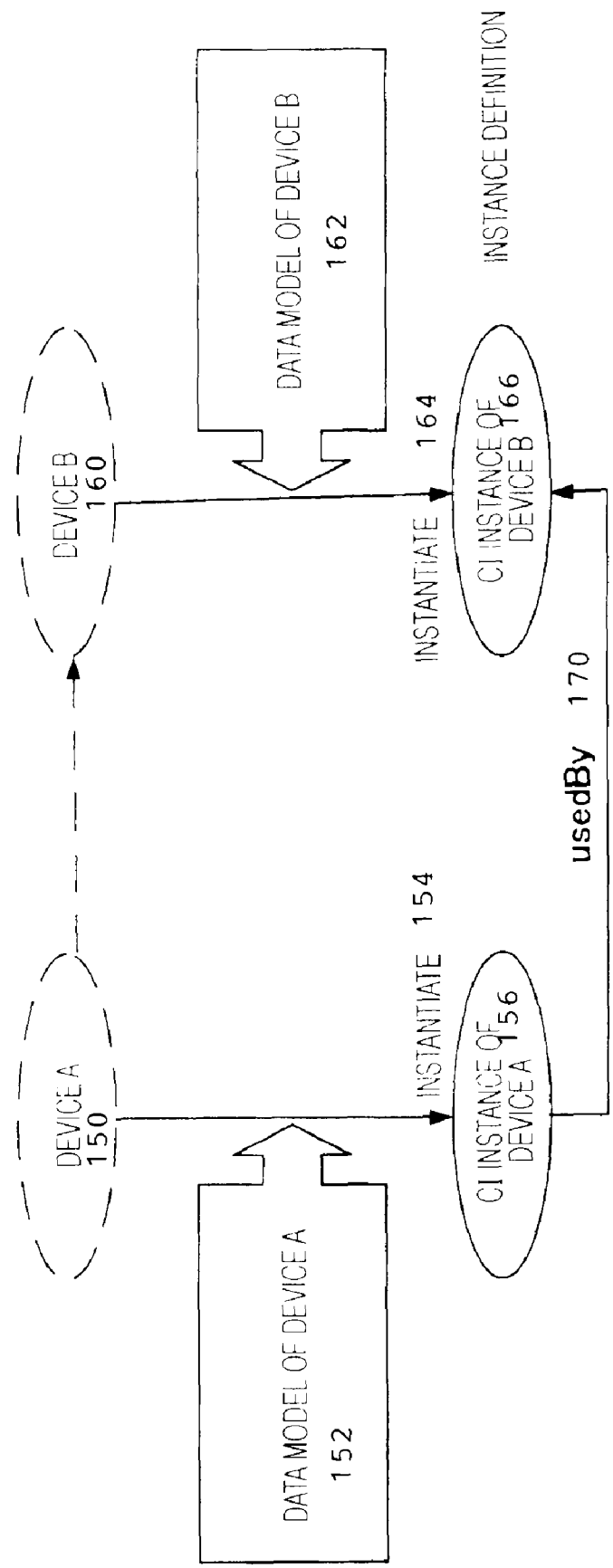

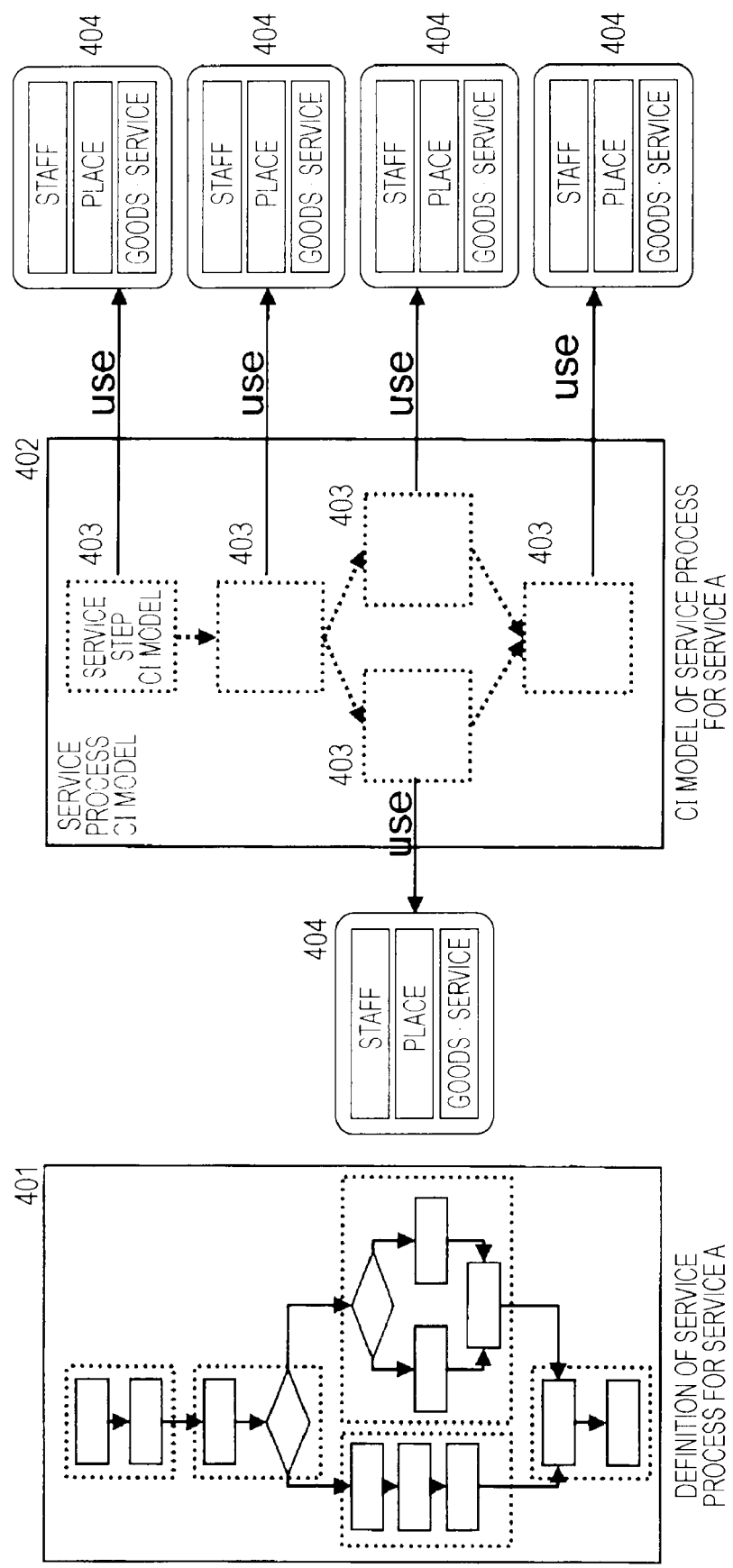

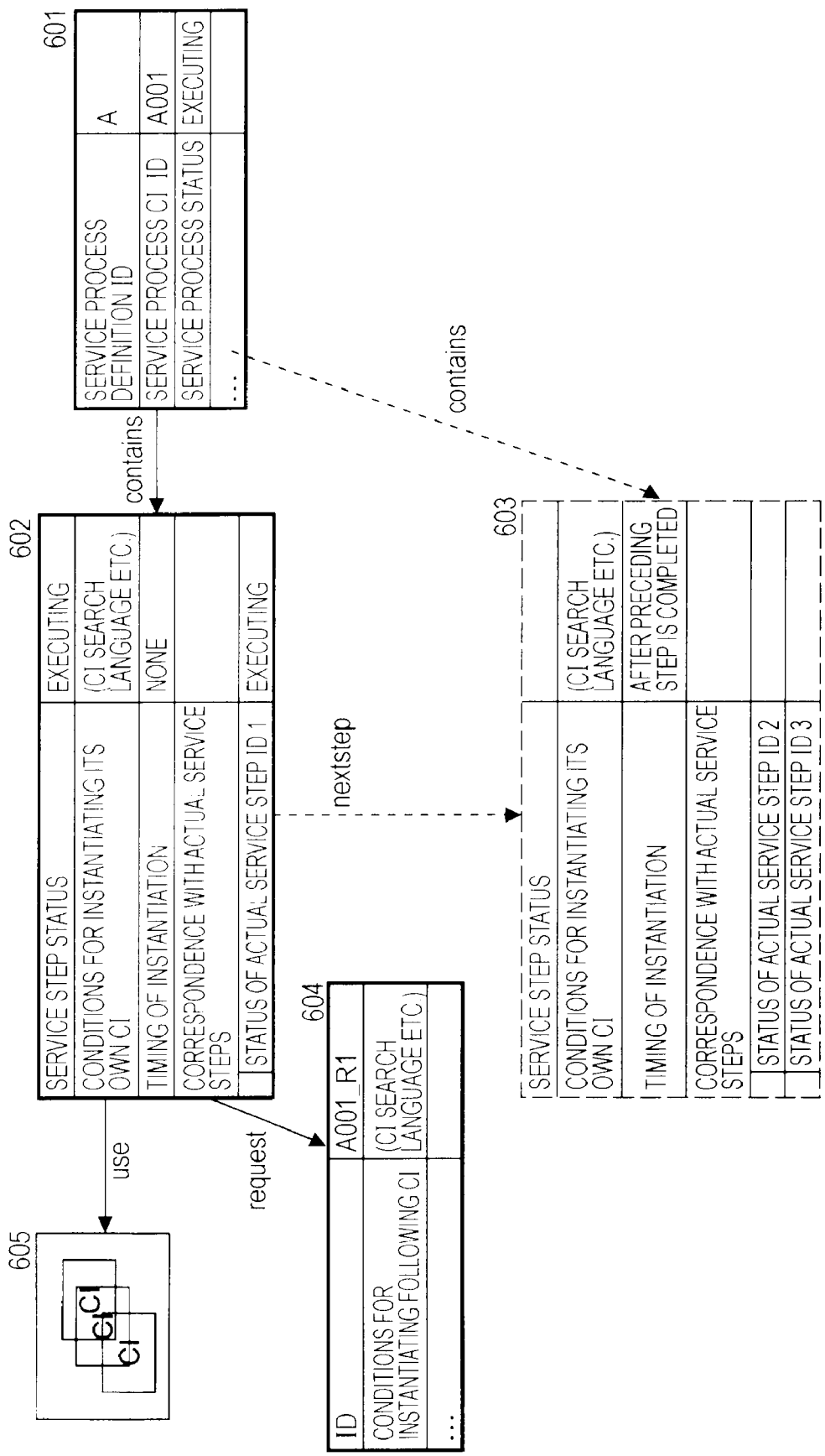

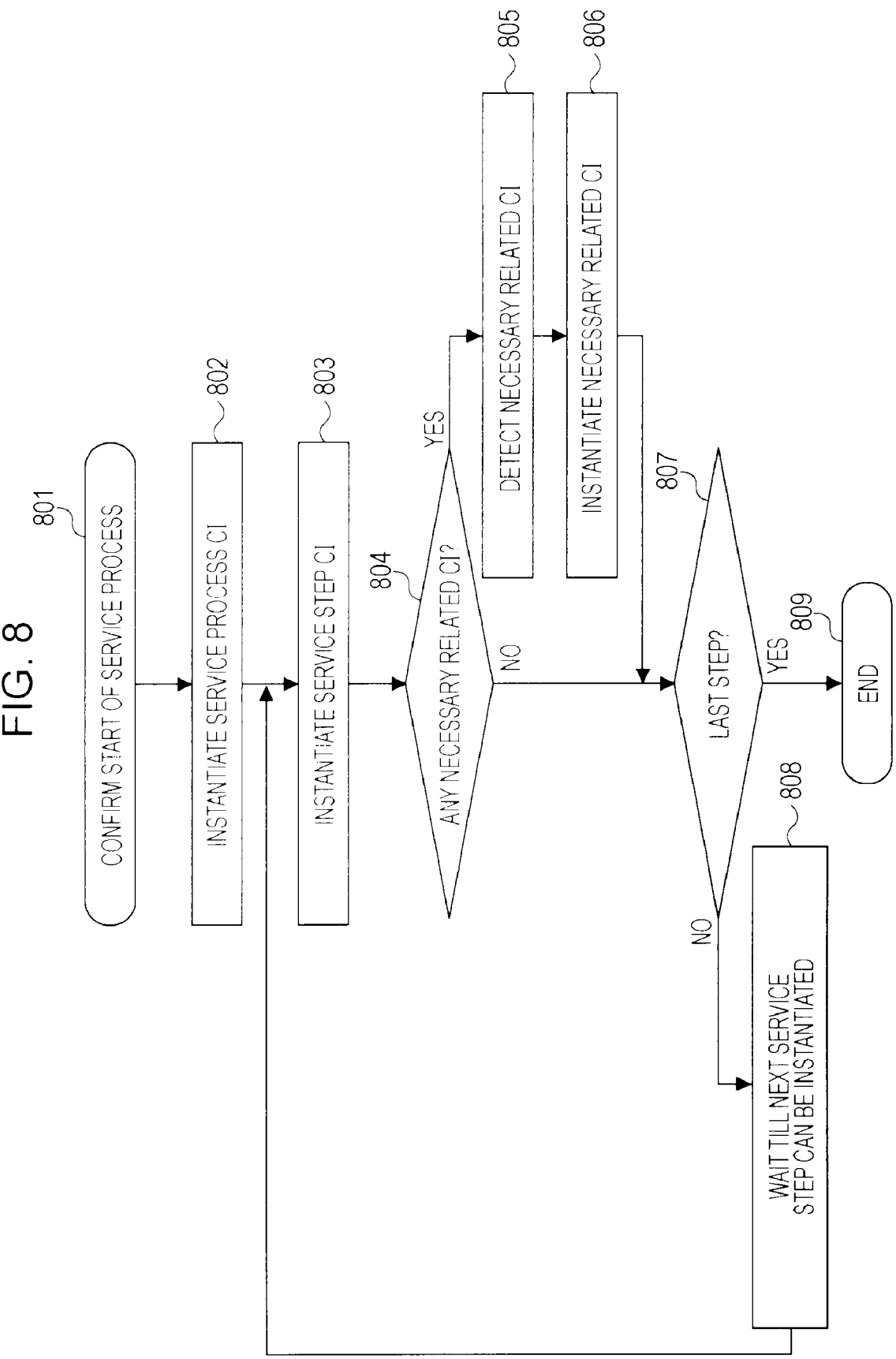

MANAGING SERVICE PROCESSES

PRIORITY

This application is based on and claims the benefit of priority from Japanese Patent Application No. 2008-42992, filed Feb. 25, 2008.

BACKGROUND

The Information Technology Infrastructure Library (ITIL) (a trademark of the British government) is a collection of best practices for implementing IT service management. The focus of the ITIL is on service supports and service delivery. One of the service supports is configuration management. Configuration management is a process of identifying configuration items (CI) subjected to IT service management and maintaining, updating, verifying, and auditing information regarding the configuration items. Configuration items are resources subjected to configuration management. Configuration items include not only system resources including hardware and software but also facilities necessary to provide IT services, rule books regarding the operations of IT services, documents such as operating procedure manuals and block diagrams, services for maintenance information, processes, human resources, and the like. In the ITIL framework, it is recommended to centrally manage configuration items using a configuration management database (CMDB). A CMDB is a database in which at least one predetermined attribute of each configuration item and relations with other configuration items are recorded. Capabilities provided by incorporating the CMDB include the capability to automatically discover information on configuration items (also called discovery or automatic detection) and the capability of automatically updating information on configuration items (also called tracking).

SUMMARY

Embodiments of the invention relate to a computer system, a method, and a computer program product for managing a service process that includes a plurality of service steps. Embodiments of the present invention provide automatic management of a service process. In one embodiment, in order to manage service processes and service steps in each of the service processes as configuration items in a repository such as, for example, a CMDB, an administrator prepares models regarding service processes and models regarding service steps. Moreover, a computer system detects data on a resource used in service steps and creates a set of data from the detected data to store the created set of data in the repository. The resource may be a staff, a place, goods, or a service, for example. In this arrangement, even when the sequence of the service steps in a service process or the resource to execute the service steps is changed, the computer system can automatically instantiate the CI model of the service process using the set of data.

Embodiments of the present invention relate to a computer system for managing a service process that includes a plurality of service steps. The computer system includes a discovery unit that detects data on a resource for executing the service steps and a repository. The repository holds, for each of at least one configuration item, a set of data that represents at least one predetermined attribute of the configuration item and a relation between the at least one configuration item and a second configuration item. The set of data includes data created using a first configuration item model in which a particular service process is defined as a first single configuration item; and data created from the detected data using a second configuration item model in which one or more particular service steps are defined as a second single configuration item.

One embodiment further includes a recording unit that stores models that are used to create data from the detected data. The models include a first configuration item model in which a particular service process is defined as a first single configuration item and a second configuration item model in which one or more particular service steps are defined as a second single configuration item.

The computer system may further include a data creating unit that creates data using the first configuration item model and creates data from the detected data using the second configuration item model.

Embodiments of the present invention relate to a computer-implemented method for managing a service process. The method includes providing a repository that holds for each of at least one configuration item, a set of data that represents at least one predetermined attribute of the configuration item and a relation between the configuration item and a second configuration item. The method also includes detecting data on a resource to execute at least one of a plurality of service steps of the service process and creating, in response to a particular service process starting, data using a first configuration item model in which the particular service process is defined as a single configuration item. The first configuration item model may be stored in the repository. The computer system also creates data from the detected data using a second configuration item model in which one or more particular service steps are defined as a single configuration item. The second configuration item model may be stored in the repository. The repository may be, for example, a CMDB. A configuration item and a relation between the configuration item and another configuration item may be implemented as, for example, the instance of static data or the instance of a class in Java (a trademark of Sun Microsystems, Inc.).

The data detection may be performed in the repository or a recording unit that is connected to the computer system and stores data on resources. The method may also include creating, from the detected data, a set of data that represent at least one predetermined attribute of the resource and a relation between the resource and another configuration item, the created set of data being stored in the repository.

The first configuration item model may represent at least one predetermined attribute of the service process and a relation between the service process and one or more service steps and the second configuration item model may represent at least one predetermined attribute of the service steps and a relation between the service steps and a resource to execute the service steps.

The first configuration item model may include an attribute for identifying a second configuration item model associated with a service step to be executed when the service process is started.

The second configuration item model may include an attribute of a condition for creating a set of data using the second configuration item model and an attribute of timing of creating a set of data using the second configuration item model. The second configuration item model may define a plurality of service steps that use the same resource as a single configuration item.

One embodiment of the present invention is a method for managing a service process that includes a plurality of service steps. The method is performed in a computer system that includes a repository that may hold, for each configuration item, a set of data that represents at least one predetermined attribute of the configuration item and a relation with another configuration item.

Embodiments of the present invention include a computer-implemented method for managing a service process. The system provides a repository that holds, for each of at least one configuration item, a set of data that represents at least one predetermined attribute of the configuration item and a relation between the configuration item and a second configuration item. The method includes creating, in response to a particular service process starting data using a first configuration item model in which the particular service process is defined as a single configuration item, the first configuration item model being stored in the repository; and creating data using a second configuration item model in which one or more particular service steps are defined as a single configuration item, the second configuration item model being stored in the repository. Creating data using the second configuration item model is carried out by detecting data on a resource to execute the particular service steps: creating data from the detected data; and storing the created data in the repository.

Embodiments of the present invention include a computer program product for managing a service process that includes a plurality of service steps. The computer program product includes a computer-readable medium having computer usable program code embodied therewith. The computer usable program code includes computer program instructions for providing a repository that holds, for each of at least one configuration item, a set of data that represents at least one predetermined attribute of the configuration item and a relation between the configuration item and a second configuration item. The computer usable program code further includes computer program instructions for detecting data on a resource to execute at least one of a plurality of service steps of the service process. The program product also has computer program instructions for creating, in response to a particular service process starting, data using a first configuration item model in which the particular service process is defined as a single configuration item, the first configuration item model being stored in the repository; and computer program instructions for creating data from the detected data using a second configuration item model in which one or more particular service steps are defined as a single configuration item the second configuration item model being stored in the repository.

The first configuration item model may represent at least one predetermined attribute of the service process and a relation between the service process and one or more service steps, and the second configuration item model may represent at least one predetermined attribute of the service steps and a relation between the service steps and a resource to execute the service steps.

The first configuration item model may include an attribute for identifying a second configuration item model associated with a service step to be executed when the service process is started. Creating a set of data using the second configuration item model may include identifying, on the basis of the attribute for identifying the second configuration item model, a service step for which a set of data need to be created. The second configuration item model may include an attribute of a condition for creating a set of data using the second configuration item model.

The condition in a second configuration item model of a particular step out of the plurality of service steps may include a condition for creating a set of data using a second configuration item model of a following step out of the plurality of service steps (hereinafter the condition of the following step), and the method may further include determining the condition of the following step before the preceding service step is completed.

Creating a set of data using the second configuration item model of the following step may include creatine the set of data using the condition of the following step and a condition for creating a set of data defined in the second configuration item model for the following step.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWING

FIG. 2A shows the creation of the CI instances of devices A and B and the relation instance.

FIG. 4 shows an embodiment of the present invention in which a service process and service steps are modeled.

FIG. 6A shows a case where the conditions for instantiating the following service step vary with the result of the preceding service step.

FIG. 8 is a flowchart showing the instantiations of the CIs of a service process and service steps in an embodiment of the present invention.

DETAILED DESCRIPTION

Figure 1:
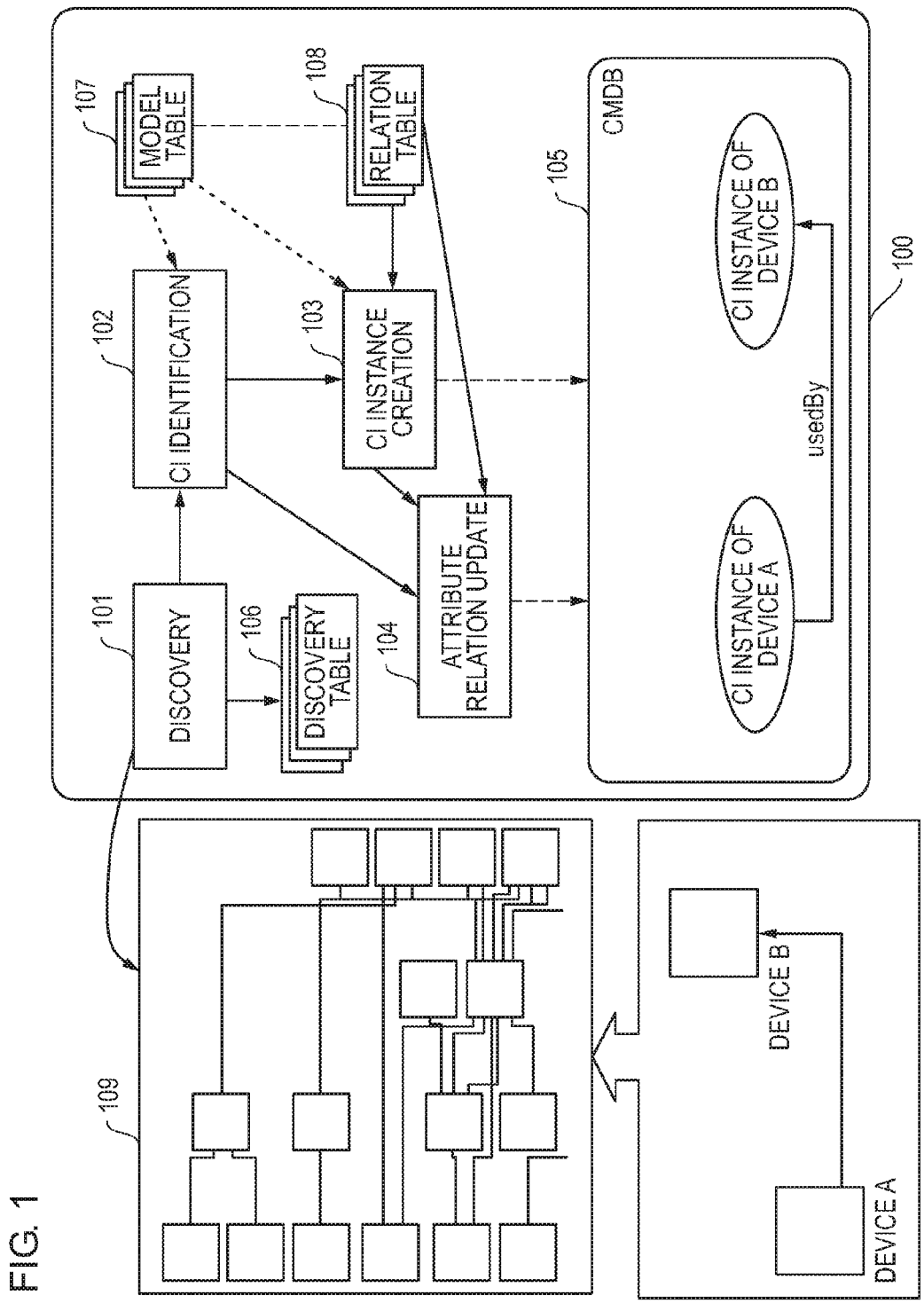
FIG. 1 shows an example of a computer system that includes a CMDB.

International Business Machines Corporation (hereinafter, IBM) provides Tivoli Change and Configuration Management Database (hereinafter called Tivoli CCMDB) as software for supporting development of a CMDB and controlling operational processes on the basis of a CMDB. In the Tivoli CCMDB, operational management software is incorporated so as to perform discovery and tracking.

Hundreds of types of configuration items may be identified in a distributed network environment such as, for example, servers, clients, operating systems (OSs), middleware (such as Web, AP, DBMS, and LDAP), packaged software, management tools, network devices and storage devices. Moreover, information on each configuration item can be automatically discovered and updated such as, for example, information on the configuration of each computer, information on applications that operate on each computer, the configuration information of, for example, a network attached storage (NAS) connected to each computer, and the configuration information of, for example, a storage area network (SAN) directly connected to a network. The method for collecting information on each configuration item varies with the managed object. Basically, a computer system that manages a CMDB periodically accesses a remote interlace for management, using, for example, the Secure SHell (SSH), to read a configuration file or configuration information in an OS, or a computer system that manages a CMDB executes a configuration verification command. Thus, an agent program need not be installed in each configuration item subjected to management. A data model "Common Data Model" (hereinafter called CDM) for configuration management databases proposed by IBM may be used to arrange items of information that are discovered and updated in the aforementioned manner. These items may be arranged according to sections (categories such as Computer System, Database, Application, and Process), classes (each of which represents a base unit of data model and belongs to one or a plurality of sections), attributes (each of which represents the attribute information of data and belongs to a class), interfaces (each of which represents a group of attributes that are frequently used and belongs to a plurality of sections), relations, and data types. Information on the relations between each configuration item and other configuration items may be transferred to a GUI display tool, for example, a Tivoli Application Dependency Discovery Manager (hereinafter called TADDM) console. Then, the relations between each configuration item and other configuration items may be visually presented using individual blocks and links between the blocks.

In embodiments of the present invention, for each configuration item, a repository may hold a set of data that may represent at least one predetermined attribute of the configuration item and a relation with another configuration item. The repository may be a CMDB recording unit that records a CMDB.

Basic terms related to the CMDB will now be described. A configuration item (CI) represents a base unit of managed object in IT service management. CIs may include, for example, system resources including hardware and software, facilities necessary to provide IT services, rule books regarding the operations of IT services, documents such as operating procedure manuals and block diagrams, services for maintenance information, processes, and human resources.

A Configuration Management Database (CMDB) may be a database in which at least one predetermined attribute of each CI and the relations between each CI and other CIs are recorded. The CMDB is part of configuration management in the ITIL framework. Conceptually, the CMDB is a database. Physically, the CMDB can take the form of a database system, a spreadsheet of spreadsheet software, and so on. An administrator may readily understand the relations between CIs using the CMDB.

A CI instance may represent data corresponding to a CI. In the CMDB, each CI instance may be expressed as an instance of a data model. An example of an instance may include an instance of static data or an instance of a class in Java (a trademark of Sun Microsystems, Inc.). Implemented instances of Java classes may be stored in a CMDB, using, for example, a mechanism called Java Data Objects (JDOs) in which instances of Java classes are persisted and stored in a hard disk. Thus, even when the power of a computer system is turned off, created instances of Java classes do not disappear, and when the power is restored, the instances of Java classes are read from a storage unit (for example, a hard disk) to be loaded into a main memory as instances of Java classes that can be changed or deleted by Java programs. The following description is given, sometimes assuming that CIs are implemented in a CMDB as instances.

A data model is a schema or defining CIs and is all information model that provides consistent definitions of managed CIs and the relations between the CIs. Specifically, a data model may define a predetermined attribute of each CI and the relations between each CI and other CIs (for example, manufacturing equipment and processes). One example of a data model includes a data model CDM for configuration management databases proposed by IBM. The CDM may be implemented in, for example, the Unified Modeling Language (UML).

An attribute may identify or describe each CI in management of CIs. Examples of attributes are not limited to but include the following items: the name of a CI (the generic name of a CI, for example, a server, a client, or a firewall), a product number (ID) (a number for identifying a predetermined entity of a CI, for example, a production number or a serial number), a category (the classification of a CI, for example, hardware, software, or a document), a type (the description of a CI that describes the further details of classification according to categories), a model number (the model number of a CI named by a provider), a warranty period (a warranty period provided by the provider of a CI), a version number (the version number of a CI), a location (a place where a CI exists, for example, the installation place of a PC, a library for software, a storage area for media, or a site where a service is provided), a responsible owner (the name of a manager for a CI), a responsibility start date (a date when a responsible owner is in charge of a CI), a provider (the developer or provider of a CI), a license (for example, a license number and the number of licenses), a supply date (a date when a CI is supplied to an organization), an acceptance date (a date when a CI is accepted by an organization), a service start date (a date when a CI is placed in service), the status of a CI (the current status, for example, in operation, under test, or in trouble, or the future status, for example, the scheduled status of a CI), and the status of a CI instance (a CI instance is valid or invalid). In the future, attributes necessary in IT service management may be continuously defined.

A relation represents the relationship between CIs. A relation can be defined in a data model in the same manner as a CI. Examples of relations include assigns, canConnect, canUse, connectAt, connects, controls, deployedOn, Located, Managed, Owned, provides, runAt, uses, and usedBy. In the future, relations necessary in IT service management may be continuously defined.

In an embodiment of the present invention, a CMDB recording unit stores a set of data. For each CI, a set of data may represent at least one predetermined attribute of the CI and the relations between that CI and other CIs. In an embodiment of the present invention, a service process includes a plurality of service steps. A service process may be modeled using, for example, the structure of the CMDB. In the model of a service process, called the first configuration item model, a service process may be defined as a single configuration item. The first configuration item model may represent at least one predetermined attribute of each service process and the relations between each service process and one or more service steps.

In a similar manner, one or more service steps may be modeled using, for example, the structure of the CMDB. In the model of one or more service steps, called the second configuration item model, one or more service steps may be defined as a single configuration item. The second configuration item model may represent at least one predetermined attribute of each service step and the relations between that service step and resources to execute that service step or the relations between that service step and other service steps.

An embodiment of the present invention will now be described in accordance with the drawings. The present embodiments are used to describe examples of the present invention, and it should be understood that there is no intention to limit the present invention to the embodiments described here. The same reference numerals denote the same corresponding elements throughout the following drawings, except where specifically noted.

FIG. 1 shorts an example of a computer system (100) that includes a CMDB for the management of CIs (for example, devices A and B). The computer system (100) includes a discovery unit (101), a CI identifying unit (102), a CI instance creating unit (103), an attribute and relation updating unit (104), and a CMDB (105), all of which may be provided in a single computer or distributed among a plurality of computers. The computer system (100) further includes a discovery table (106), a model table (107), and a relation table (108). These tables may be provided in a single computer or distributed among a plurality of computers.

FIG. 1 shows an example of a TADDM console screen (109). The screen shows CIs and connection relations between the CIs. In this case, the CIs and the connection relations between the CIs shown on the screen are just examples, and all CIs and all the connection relations between the CIs managed by the computer system (100) are not shown on the screen.

In this embodiment, the compute system (100) manages only CIs that are managed objects of the computer system (100). The managed objects of the computer system (100) may include objects that can be accessed from the computer system (100) or objects that can be discovered by the computer system (100). The discovery unit (101) detects (discovers) information on CIs that are managed objects of the CMDB. Some of the CIs are shown on the TADDM console screen (109). The computer system (100) may include a plurality of discovery units (101). Managed objects may be connected to the computer system via a network. The network may be wired or wireless. The administrator of the computer system can set predetermined detection targets. The range of detection can be specified by, for example, domain names, IP addresses, MAC addresses, the identifiers of devices, or database names, or combinations of these items. When a CI that is a managed object is, for example, an industrial device, information on the industrial device may be detected. The detected information may include information on a new CI or the value of an updated attribute or an updated relation of an existing CI. A new CI is a CI that is detected by the discovery unit (101) but is not registered in the CMDB (105). An existing CI is a CI the instance of which is already registered in the CMDB (105). The discovery unit (101) may detect information on a CI on the basis of discovery data stored in the discovery table (106) (for example, A-Discovery in FIG. 2B, 202). It is specified in the discovery method in a corresponding data model (FIG. 2B, 201) which discovery data is used. The discovery unit (101) transfers the detected information on the CI to the CI identifying unit (102).

The CI identifying unit (102) receives the information on the aforementioned CI from the discovery unit (101) and processes the result of the detection. The CI identifying unit (102) determines, with reference to the CMDB (105), whether the information on the aforementioned CI is information on a new CI or the value of an updated attribute or an updated relation of an existing CI. This determination may be made by, for example, comparing the information on the aforementioned CI with the instance names of CIs stored in the CMDB. When the information on the aforementioned CI is information on a new CI, the CI identifying unit (102) transfers the information to the CI instance creating unit (103). On the other hand, when the information on the aforementioned CI is the value of an updated attribute or an updated relation of an existing CI, the CI identifying unit (102) transfers the information to the attribute and relation updating unit (104).

Figure 2B:
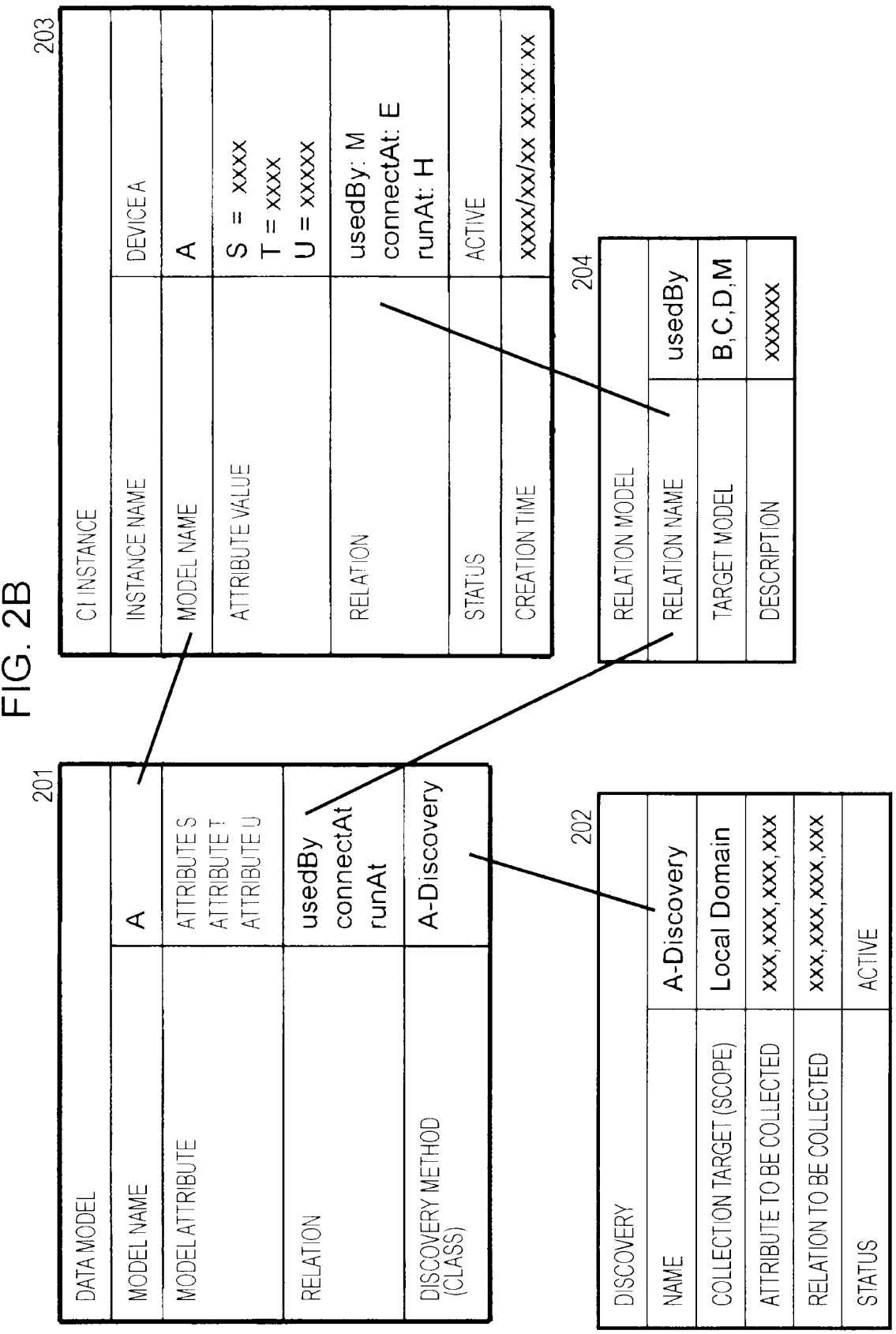
FIG. 2B shows a data model, a discover instance, a CI instance, and a relation model.

The CI instance creating unit (103) creates, from the information on the CI, a set of data that represents predetermined attributes of the CI and the relations between the CI and other CIs, on the basis of the data model (FIG. 2B, 201) stored in the model table (107) and a relation model (FIG. 2B, 204) stored in the relation table (108). Collectively, the information on the aforementioned CI is referred to as an instance. The set of data may be implemented as, for example, an instance of static data or an instance of a class in Java (a trademark of Sun Microsystems. Inc.). An example of a CI instance is shown in FIG. 2B (203). The aforementioned set of data is stored in the CMDB (105). The set of data, or CI instance, may include attributes and relations (refer to 203). Alternatively, the set of data may include attributes in the CI instance, and relations may be separately stored in the CMDB (105) as relation instances. In the latter case, the CI instance includes links that identify related relation instances.

The attribute and relation updating unit (104), together with the discovery unit (101), performs tracking. The attribute and relation updating unit (104) reflects the value of an updated attribute or an updated relation of a CI in the CI instance stored in the CMDB. That is, the attribute and relation updating unit (104) updates the value of an attribute or a relation of the CI instance of the CI. This update may be performed by replacing the value with the information on the CI detected by the discovery unit (101). In this replacement, the values of all attributes or all relations of the CI instance may be replaced with the information on the CI detected by the discovery unit (101), or only values different from those in the information on the CI detected by the discovery unit (101) may be replaced.

The CMDB (105) stores the CI instance (FIG. 2B (203)). The discovery table (106) stores the discovery data FIG. 2B, 202). The discovery data is used by the discovery unit (101) when information on CIs is detected. The discovery data (FIG. 2B, 202) may be implemented as, for example, an instance of static data or an instance of a class in Java (a trademark of Sun Microsystems, Inc.). The discovery data is also called a discovery policy. The discovery data (FIG. 2B, 202) includes the range of search by the discovery unit (101), i.e., collection targets (scope), attributes to be collected, and relations to be collected that define the range of search for CIs (FIG. 2B, 202). Collection targets can be specified by, for example, subnet IP addresses, a range of IP addresses, individual IP addresses, MAC addresses, the identifiers of devices, host names, or database names, or combinations of these items. In another embodiment, a schedule management database (not shown) connected to the computer system (100) via a network may be specified as a collection target. A schedule management database stores, for example, data about process management in which devices are used. In yet another embodiment, a database (not shown) that stores a batch process definition file may be specified as a collection target. When the collection target is a database that stores a batch process definition file, the discovery unit (101) may perform detection by reading the content of the batch process definition file. A batch process definition file may store, for example, data that indicates the sequence in which devices are used.

The model table (107) stores the data model (FIG. 2B, 201). The data model is used when a set of data that represents predetermined attributes of a CI and the relations between the CI and other CIs are created by the CI instance creating unit (103).

The relation table (108) stores the relation model (FIG. 2B, 204). The relation model is used when a set of data that represent predetermined attributes of a CI and the relations between the CI and other CIs are created by the CI instance creating unit (103).

FIG. 1 shows that the discovery unit (101) has detected CIs connected to the computer system (100) via a network. The discovery unit has also detected information on a device A, a device B that uses the device A, and the relation between these devices. Then, after the CI identifying unit (102) determines whether to create CI instances, the CI instance creating unit (103) creates the CI instance of device A, the CI instance of device B, and the instance of the relation (usedBy) between these devices. The CI instance creating unit (103) stores the created instances in the CMDB (105).

FIG. 2A shows the creation of the CI instances (156, 166) of CIs (for example, the device A (150) and device B (160)) and the instance of the relation, usedBy (170), between these devices. The CI instance of the device A (156) is created (154), using the data model of device A (152), by the CI instance creating unit (103) from information on the device A (150) detected by the discovery unit (101). Similarly, the CI instance of the device B (166) is created (164), using the data model of the device B (162), by the CI instance creating unit (103) from information on the device B 160 detected by the discovery unit (101). The data models of the devices A and 13 (152, 162) are stored in the model table (FIG. 1, 107). The instance of the relation between the CIs. i.e., the relation usedBy 170 between the devices A and B, is created, on the basis of a corresponding relation model (not shown), by the CI instance creating unit (103) from the information on the device A detected by the discovery unit (101). The relation model is stored in the relation table (108).

FIG. 2A shows that the CI instance of the device B is created using the data model of the device B, as described above. When the devices are, for example, devices B1, B2, and B3, an instance is created from information on each of the devices B1, B2, and B3, using the data model of the device B, so that the CI instance of the device B1, the CI instance of the device B2, and the CI instance of the device B3 are created. The CI instances of the devices B1, B2, and B3 are stored in the CMDB (105).

FIG. 2B shows the data model (201) stored in the model table (FIG. 1, 107), the discovery instance (202) stored in the discovery table (FIG. 1, 106), the CI instance (203) (of the device A) stored in the CMDB (FIG. 1, 105), and the relation model (204) stored in the relation table (FIG. 1, 108). The data model (201) is a schema for defining a CI. The data model (201) may include, for example, the description of each of the following items: "model name" that indicates which CI model a corresponding model is, "model attribute" that indicates attributes possessed by a CI specified in the model name, "relation" that may exist between the CI specified in the model name and other CIs, and "discovery method" that identifies a discovery instance for detecting the CI specified in the model name. The model attribute can be defined in accordance with, for example, attributes defined in the data model CDM (proposed by IBM) for configuration management databases. However, the model attribute is not limited to these attributes. In the CDM, 2609 types of attributes are defined. The administrator of a CMDB can specify predetermined attributes in the data model (201). The relation can be defined in accordance with, for example, relations defined in the aforementioned CDM. However, the relation is not limited to these definitions. In the CDM, 57 types of relations are defined. The discovery method can be identified by the name of a corresponding discovery instance. In the case in FIG. 2B, the discovery method is A-Discovery.

The discovery instance (202) includes, for example, the description of each of the following items: "name" of the discovery instance identified by the discovery method in the data model (201), "collection target (scope)" of managed objects (CIs) collected by the discovery unit (101), "attribute to be collected" and "relation to be collected" of the managed objects (CIs) collected by the discovery unit (101), and "status" that indicates whether the discovery instance is active or inactive.

The CI instance (203) includes, for example, the description of each of the following items: "instance name" for identifying which CI the instance corresponds to, "model name" that indicates which data model is used to create the instance, "attribute value" that indicates the values of attributes identified by the data model, "relation" that indicates the description (value) of each relation identified by the data model, "status" that indicates whether the instance is active or inactive, and "creation time" when the CI instance is created. The CI instance may further include a CI instance identifier unique to the CI instance. The CI instance identifier is not limited to a specific one as long as it can distinguish the CI instance from other CI instances. For example, a host name, a serial number, or a combination of other attributes the values of which are constant can be used as the CI instance identifier. The CI instance (203) shown in FIG. 2B indicates that the CI instance (203) is the CI instance of the device A; that the CI instance (203) is created using a data model A; that the CI instance (203) includes S, T, and U as the attributes, and the attributes have values; that the CI instance (203) includes respective relations in which the CI instance (203) is used by M (usedBy: M), is connected to E (connectAt: E), and is executed or run at H (runAt: H); and that the CI instance is active. The CI instance (203) further indicates data of the creation time of the CI instance.

The relation model (204) is a schema for defining the relations identified by the data model (201). The relation model (204) includes the description of each of the following items: "relation name" such as usedBy, "target model" for identifying data models that are the targets of the relation, and "description" of the relation.

Figure 3:
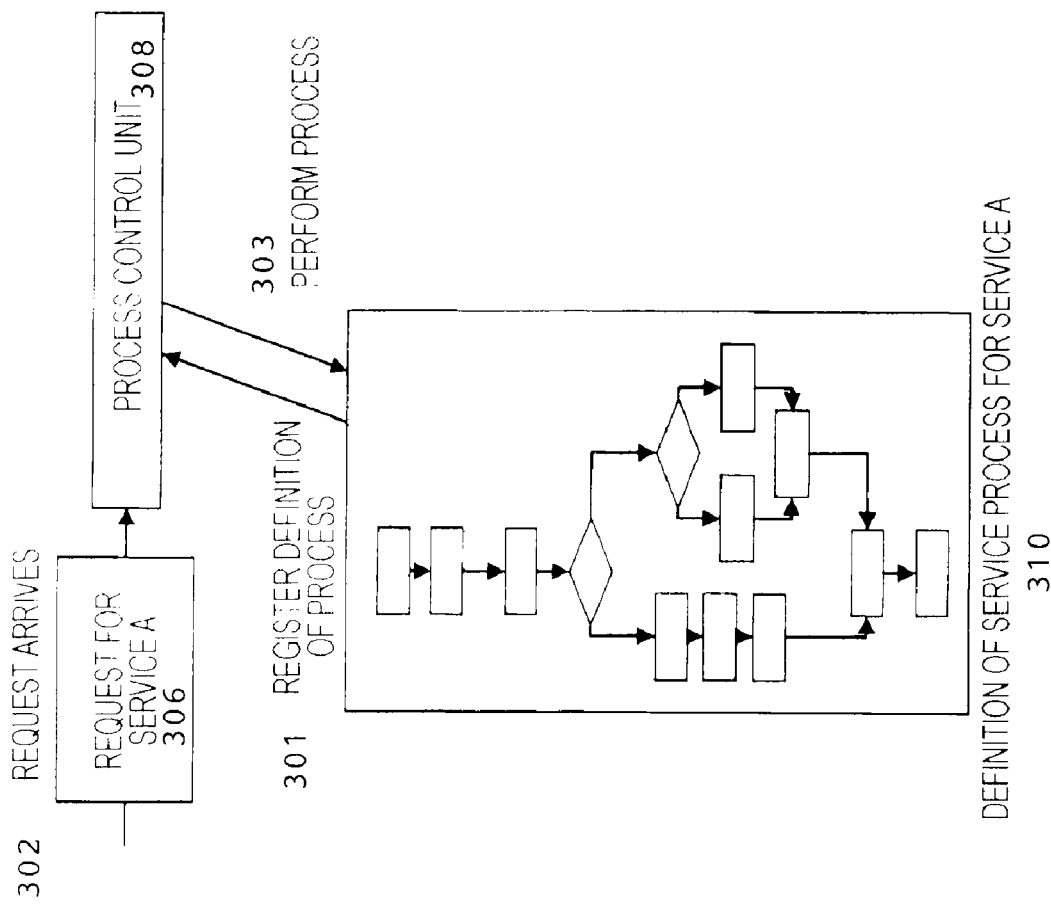
FIG. 3 shows conventional processing of a service process for a service A.

FIG. 3 shows conventional processing of a service process for a service A. In this processing of the service process, the administrator may define a service process for handling service requests and service steps included in the service process and stores the service process and the service steps in a storage unit as the definition of service process (310) (block 301). A process control unit (308) receives a service request for the service A (Request for Service A (306)) (block 302). The process control unit (308) starts to instantiate the CI model of the service process for the service A upon receiving the service request (306) (block 303). Upon the process control unit (308) creating the instance, for each of the service steps, the process control unit (308) may inquire of the administrator about resources to execute each of the service steps such as staff, places, goods (such as devices), or services. In response to the inquiry, considering the progress of the service steps or the progress of other service processes, the administrator may retrieve appropriate resources and assign the retrieved resources to each of the service steps.

FIG. 4 shows an embodiment of the present invention in which a service process and service steps are modeled. The service process for the service A includes a plurality of service steps (401). Reference numeral 401 in FIG. 4 shows the concept for defining a plurality of service steps with predetermined granularity. The granularity can be appropriately defined by the administrator of the service process. For example, a plurality of service steps that use the same resources or service steps that are executed in the same period of time may be set as a unit of granularity.

Reference numeral 402 in FIG. 4 shows the concept for modeling a service process and service steps. A service process is modeled using, for example, the structure of the CMDB (402). The model, sometimes called the CI model of a service process, can be prepared by, for example, the administrator of the service process. In the CI model of a service process, the service process may be defined as a single configuration item. The CI model of a service process indicates at least one predetermined attribute of the service process and the relations between the service process and one or more service steps. The predetermined attributes may be, for example, "service process CI_ID" and "service process status". The relation may be, for example, "contains".

A service step is modeled using, for example, the structure of the CMDB (403). The model, sometimes be called the CI model of a service step, can be prepared by, for example, the administrator of the service process. In the CI model of a service step, one or more service steps may be defined as a shingle configuration item. The CI model of a service step indicates at least one predetermined attribute of the service step and the relations between the service step and resources (404) to execute the service step. The predetermined attributes may include, for example, "service step status", "conditions for instantiating its own CI", "timing of instantiation", and "correspondence with actual service steps" (the status of each actual service step ID). The relation may be, for example, "use". The CI model of a service step may further indicate a relation with another service step. An example of the relation could be "nextstep". The aforementioned relations may be used to instantiate the CI model of a service step. Moreover, the relations may also be conditions for finding another configuration item, for example, another service step.

The aforementioned resources include, for example, staff, places, goods, and services (refer to 404). Each of the resources is a single configuration item. Thus, each of the resources may be modeled using, for example, the structure of the CMDB. Each of the resources may also be managed in, for example, the CMDB.

Figure 5A:
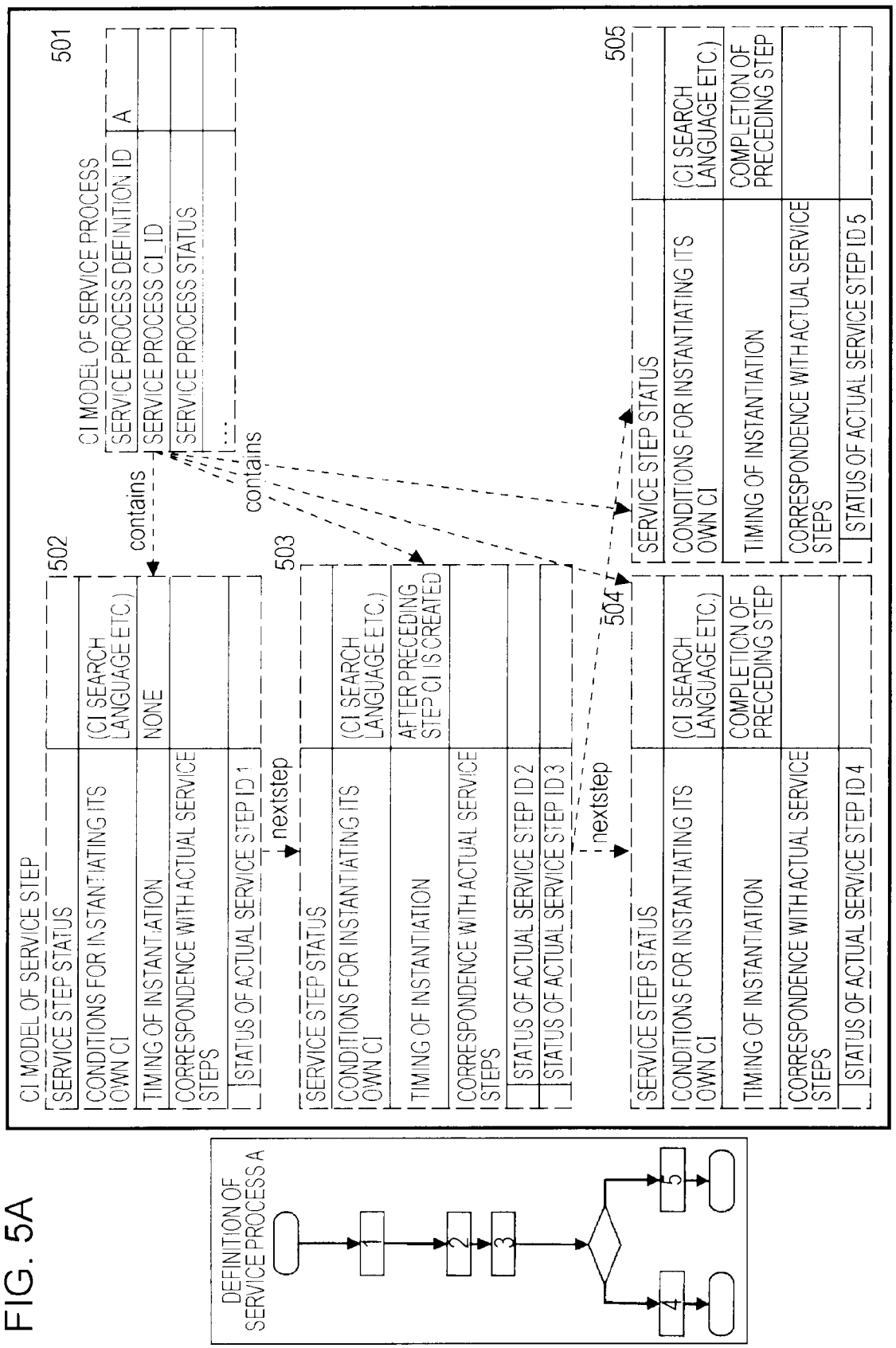
FIG. 5A shows an embodiment of the present invention in which the CI models of a service process and service steps are instantiated.

FIGS. 5A to 5D show an embodiment of the present invention in which the CI models of a service process and service steps are instantiated. FIG. 5A shows the CI model of a service process and the CI models of service steps in the embodiment of the present invention.

The CI model of the service process (501) includes a "service process definition ID." In the case in FIG. 5A, "service process definition ID" is "A", indicating that the model is that of a service process A. The CI model of the service process further includes attributes "service process CI_ID" and "service process status". The attribute data of "service process CI_ID" is, for example, "A001". The attribute data of "service process status" is, for example, "starting", "executing", or "completed". The relations between the CI model of the service process (501) and the CI models of other service steps are "contains".

Each of the CI models (502 to 505) of the service steps includes "service step definition ID" (not shown) for identifying the service step concerned. Each of the CI models of the service steps further includes attributes "service step status", "conditions for instantiating its own CI", "timing of instantiation", and "correspondence with actual service steps". The attribute data of "service step status" may be, for example, "waiting", "starting", or "completed".

For example, the attribute data of "conditions for instantiating its own CI" may be the description of conditions for retrieving and identifying resources or CIs to execute a corresponding service step. The conditions may be, for example, the type and number of CIs, time, available CIs, and an alternative resource in a case where a target CI cannot be found.

The attribute data of "timing of instantiation" may be, for example, the description of conditions when the CI model of a corresponding process step is instantiated. "When the CI model of a corresponding process step is instantiated" could mean, for example, when assignment of resources identified by "conditions for instantiating its own CI" to the process step is determined. For example, the conditions might be completion of the preceding service step ("completion of preceding step" in FIG. 5A) or completion of instantiation of the CI of the preceding service step ("after preceding step CI is created" in FIG. 5A).

The attribute data of "correspondence with actual service steps" may be, for example, "status of actual service step ID" that indicates the status of each actual service step. In some embodiments, the actual service step IDs correspond to actual service step IDs 1 to 5 in the definition of the service process A in FIG. 5A. The attribute data of "status of actual service step ID" may be, for example, "waiting", "starting", "executing", or "completed". The CI model of a service step (502) includes "status of actual service step ID 1" in the definition of the service process A. Similarly, the CI model of service steps (503) includes "status of actual service step ID 2" and "status of actual service step ID 3". Similarly, the CI model of a service step (504) includes "status of actual service step ID 4". Similarly, the CI model of a service step (505) includes "status of actual service step ID 5".

The relation between the CI model of the service step (502) and the CI model of the service steps (503) is "nextstep". Similarly, both the relation between the CI model of the service step (503) and the CI model of the service step (504) and the relation between the CI model of the service steps (503) and the CI model of the service step (505) are "nextstep".

Figure 5B:
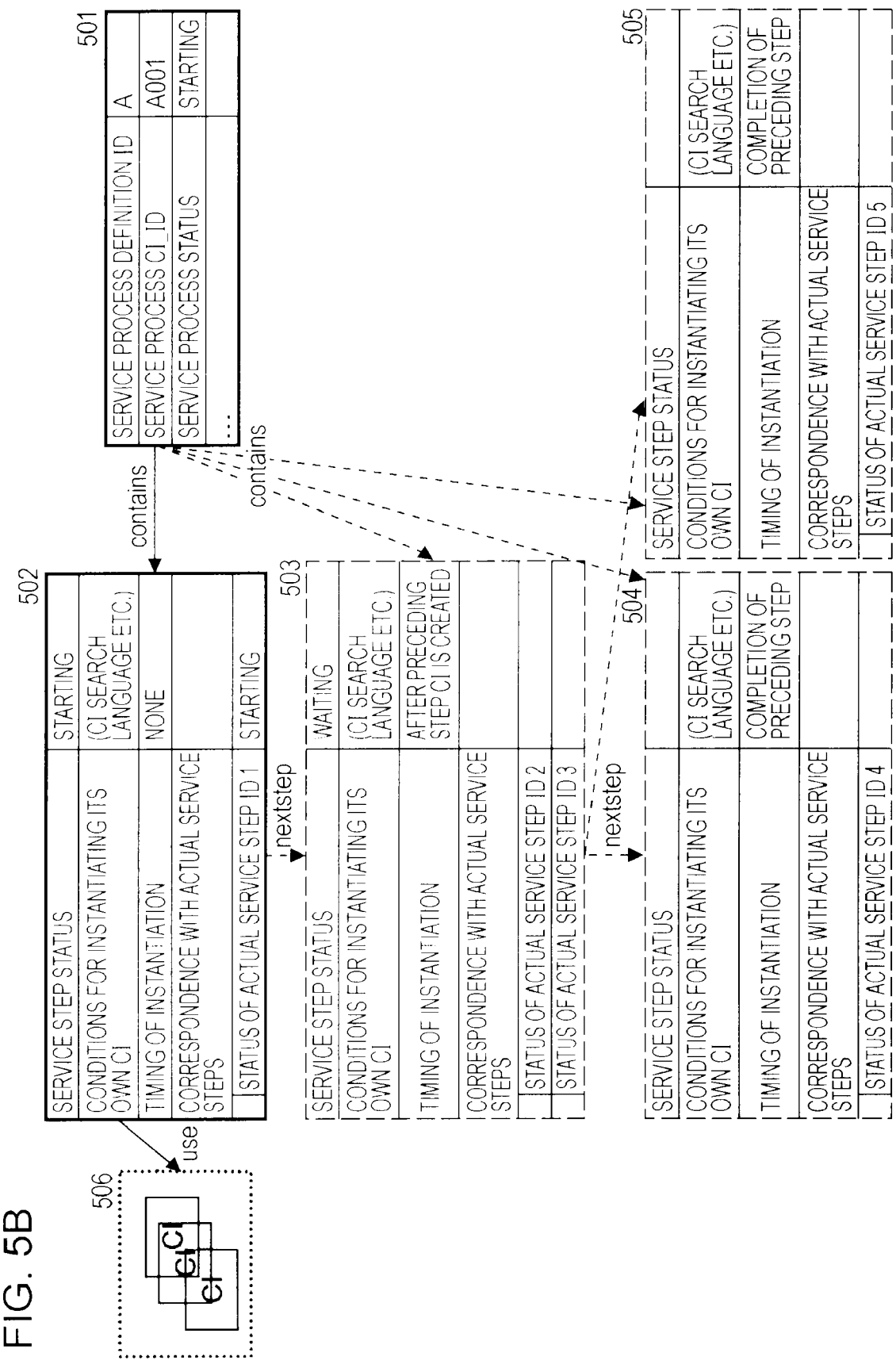
FIG. 5B shows an embodiment of the present invention in which the CI model of a service process and the CI model of the first service step are instantiated.

FIG. 5B shows the instantiation of the CI model of the service process (501) and the instantiation of the CI model of the first service step (502) in an embodiment of the present invention. In FIG. 5b, a service process status management unit (not shown) confirms a service request for the service A. In response to the service request, the service process status management unit indicates to a CI instance creating unit (not shown) to instantiate the CI model of the service process (501). The CI instance creating unit instantiates the CI model of the service process (501). In the instantiation, the CI instance creating unit finds a defined relation (contains) between the CI model of the service process (501) and each of the CI models of the service steps (502, 503, 504, and 505).

The CI instance creating unit starts to instantiate the CI model of the first service step (502) (hereinafter just called the CI model (502)) in response to the instantiation of the CI model of the service process (501). At this time, since "timing of instantiation" of the CI model of the next service step (503) (hereinafter just called the CI model (503)) is "after preceding step CI is created", the CI instance creating unit does not start to instantiate the CI model (503). The CI instance creating unit determines, in accordance with "conditions for instantiating its own CI" defined in the CI model (502), whether any resource to execute the service process (i.e., any related CI) exists. When a related CI exists, the CI instance creating unit sends a related CI discovery unit a request to detect the related CI of the service process. The related CI discovery unit obtains data on the related CI by performing detection in a CMDB (506) or detection targets of the related CI discovery unit. The CI instance creating unit instantiates the CI model of the related CI on the basis of the obtained data and stores the CI instance of the related CI in the CMDB. Then, the CI instance creating unit completes the instantiation of the CI model (502) using the CI instance of the related CI.

The service process status management unit waits until the CI model (503) can be instantiated. The time when the CI model (503) can be instantiated is defined in "timing of instantiation" of the CI model (503). Since "timing of instantiation" of the CI model (503) is "after preceding step CI is created", the instantiation of the CI model (503) is not started until the instantiation of the CI model (502) is completed. In this case, when it is assumed that the CI model (502) is the preceding CI model, the CI model (503) is called the following CI model. Moreover in this case, the service step of the CI model (502) is the preceding service step, and the service steps of the CI model (503) are the following service step.

Figure 5C:
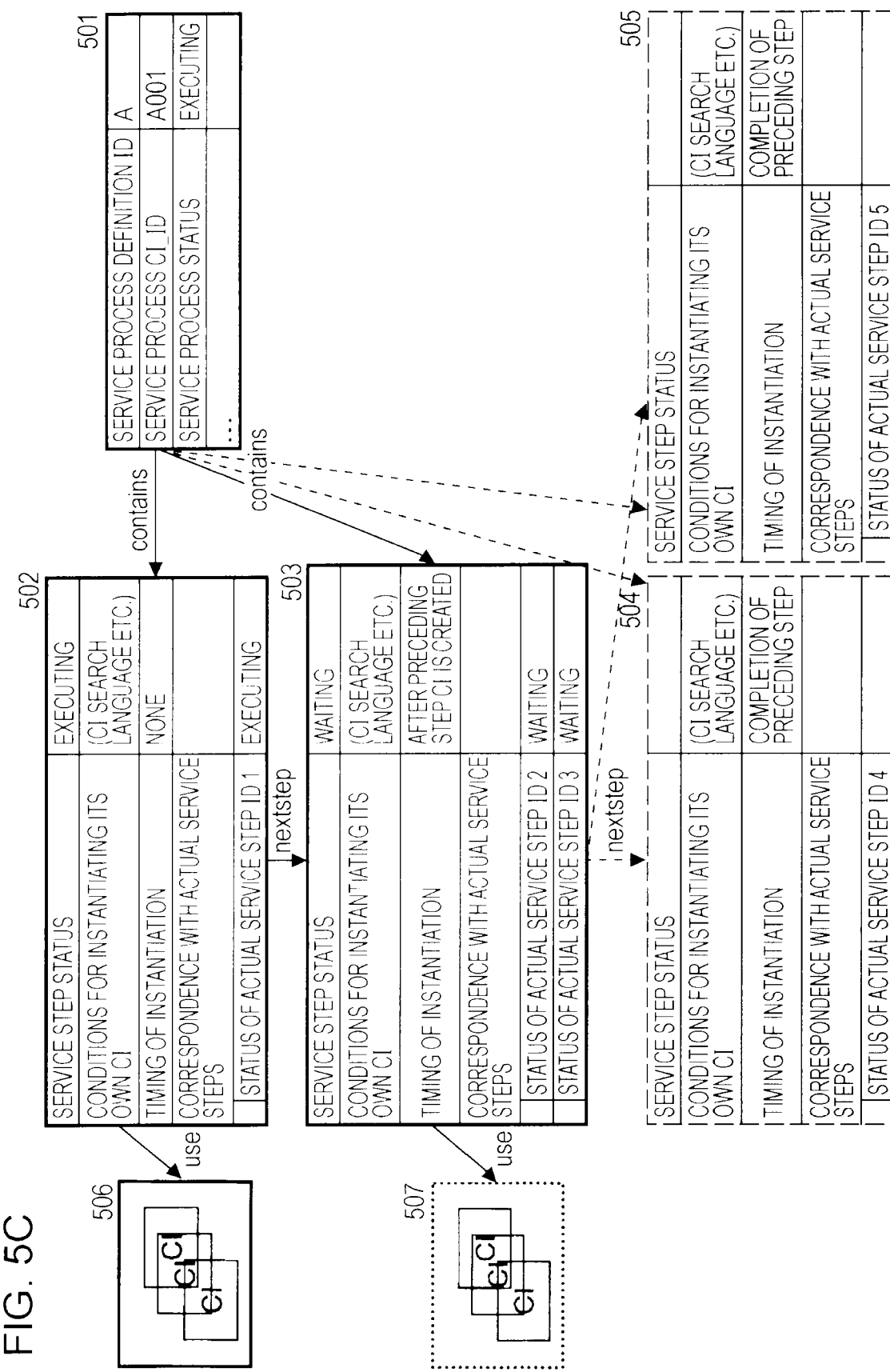
FIG. 5C shows an embodiment of the present invention in which the CI model of the next service steps is instantiated.

FIG. 5C shows the instantiation of the CI model of the next service steps in an embodiment of the present invention. The service process status management unit confirms that the instantiation of the CI model (502) has been completed. This confirmation may be made by, for example, sending a notification that the instantiation of the CI model (502) has been completed from the CI instance creating unit to the service process status management unit.

The service process status management unit indicates to the CI instance creating unit to instantiate the CI model (503). The CI instance creating unit starts to instantiate the CI model (503) in a manner similar to that described above. At this time, since "timing of instantiation" of the CI model of the next service step (504) (hereinafter just called the CI model (504)) and the CI model of the next service step (505) (hereinafter just called the CI model (505)) is "completion of preceding step", the CI instance creating unit does not start to instantiate the CI model (504) and the CI model (505). The CI instance creating unit identifies, in accordance with "conditions for instantiating its own CI" defined in the CI model (503), a resource to execute the service process, i.e., a related CI. When a related CI exists, the CI instance creating unit sends the related CI discovery unit a request to detect the related CI of the service process. The related CI discovery unit obtains data on the related CI by performing discovery in a CMDB (507) or detection targets of the related CI discovery unit. The CI instance creating unit instantiates the CI model of the related CI on the basis of the obtained data and stores the instance in the CMDB. Then, the CI instance creating unit completes the instantiation of the CI model (503). In this case, when it is assumed that the CI model (503) is the preceding CI model, each of the CI model (504) and the CI model (505) is called the following CI model. Moreover, in this case, the service steps of the CI model (503) are the preceding service steps, and the service step of each of the CI model (504) and the CI model (505) is the following service step.

Figure 5D:
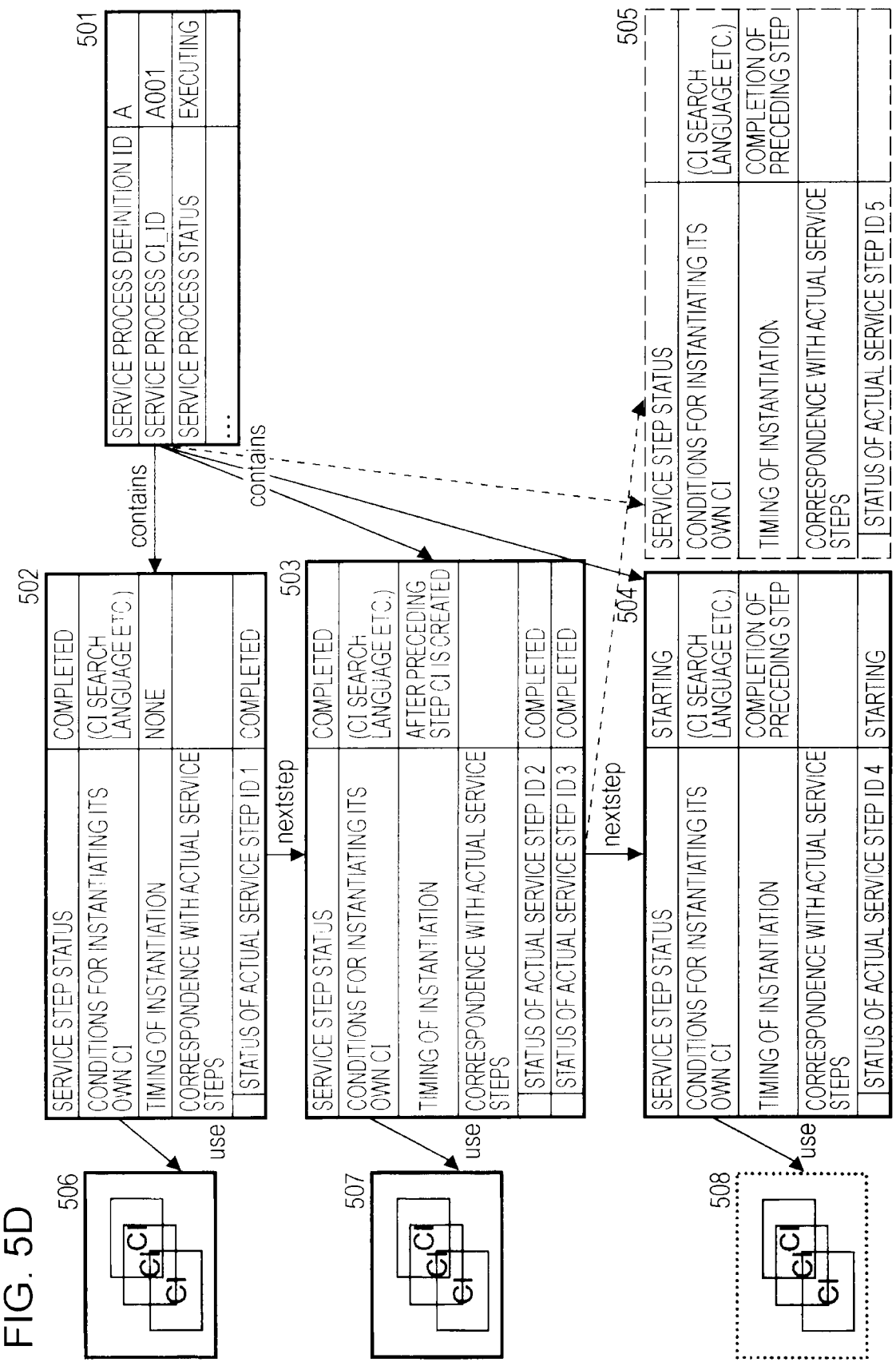
FIG. 5D shows an embodiment of the present invention in which the CI model of the next service step is instantiated.

FIG. 5D shows the instantiation of the CI model of the next service step in an embodiment of the present invention. The service process status management unit confirms that the service steps of the CI model (503) have been completed. This confirmation may be performed by, for example, the service process status management unit by directly confirming that the service steps of the CI model (503) have been completed.

The service process status management unit indicates to the CI instance creating unit to instantiate the CI model (504) or the CI model (505). The service process status management unit determines which of the CI models is instantiated by determining which branch the service process proceeds to (refer to the definition of the service process A in FIG. 5A). In FIG. 5D, since the service process proceeds to the step associated with the CI model (504), the CI instance creating unit starts to instantiate the CI model (504). The CI instance creating unit identifies, in accordance with "conditions for instantiation its own CI" defined in the CI model (504), a resource to execute the service process (i.e. a related CI). When a related CI exists the CI instance creating unit sends the related CI discovery unit a request to detect the related CI of the service process. The related CI discovery unit obtains data on the related CI by performing discovery in a CMDB (508) or detection targets of the related CI discovery unit. The CI instance creating unit instantiate the CI model of the related CI on the basis of the obtained data and stores the instance in the CMDB. Then, the CI instance creating unit completes the instantiation of the CI model (504).

Figure 6B:
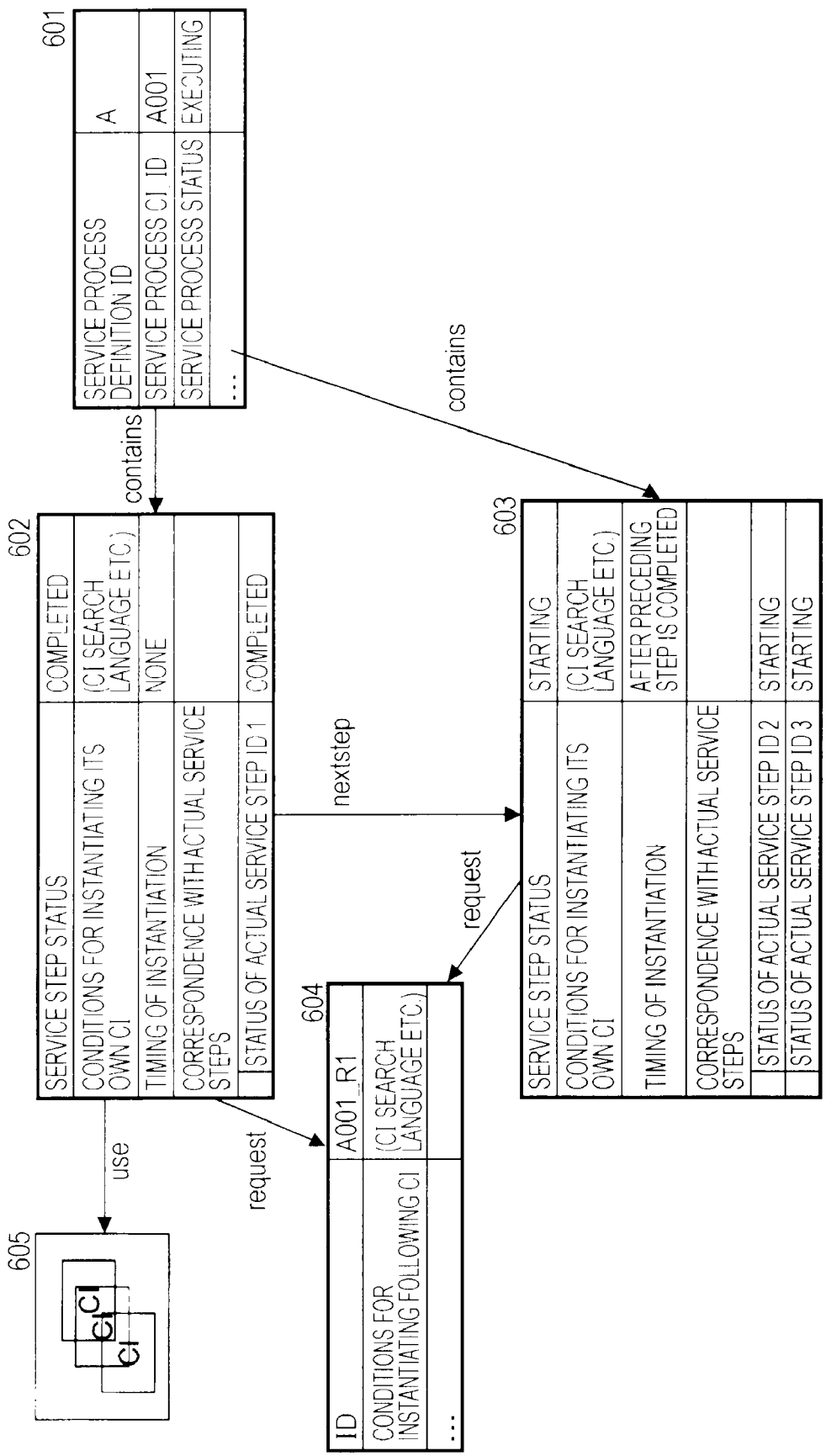
FIG. 6B shows the case where the conditions for instantiating the following service step vary with the result of the preceding service step.
Figure 6C:
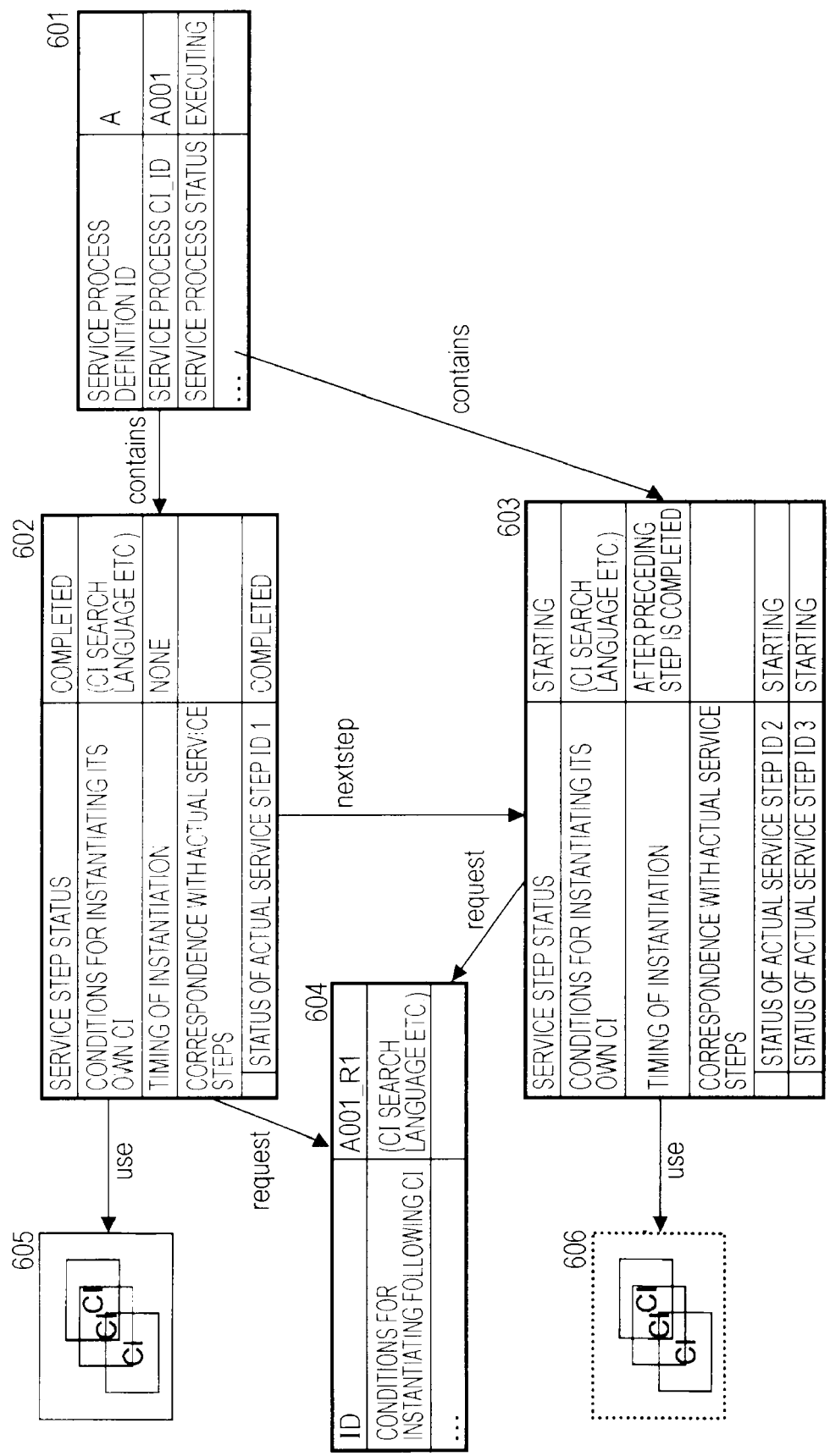
FIG. 6C shows the case where the conditions for instantiating the following service step vary with the result of the preceding service step.

FIGS. 6A to 6C show a case where the conditions for instantiating the following service steps vary with the result of the preceding service step. FIG. 6A shows that the conditions for instantiating the following CI model (603) (hereinafter, the conditions for instantiating the following CI) are determined by the result of the service step of the preceding CI model (602) (hereinafter, the preceding service step). The CI instance creating unit may determine the conditions for instantiating the following CI before the service step of the preceding CI model (602) is completed. The CI instance creating unit may define the conditions for instantiating the following CI in the same model as the CI model (602). Alternatively, the CI instance creating unit may define the conditions for instantiating the following CI in a table (604) separate from the CI model (602). In the former case, the conditions for instantiating the following CI are defined as an attribute of the CI model (602). In the latter case, for the conditions for instantiating the following CI, the CI model (602) may be linked to the table.

FIG. 6B shows that the CI instance creating unit refers to the conditions for instantiating the following CI when instantiating the model (603). The CI instance creating unit instantiates the model (603) "after preceding step is completed" defined in "timing of instantiation" in the model (603). The CI instance creating unit refers to the conditions (for example, 604) for instantiating the following CI when instantiating the model (603).

FIG. 6C shows that the CI instance creating unit instantiates the model (603). When the CI instance creating unit instantiates the model (603), the CI instance creating unit detects resources (606) for executing the service steps of the model (603) in accordance with the conditions for instantiating the model (603) and the referred conditions for instantiating the following CI. The CI instance creating unit instantiates the model (603) using data on the detected resources.

Figure 7A:
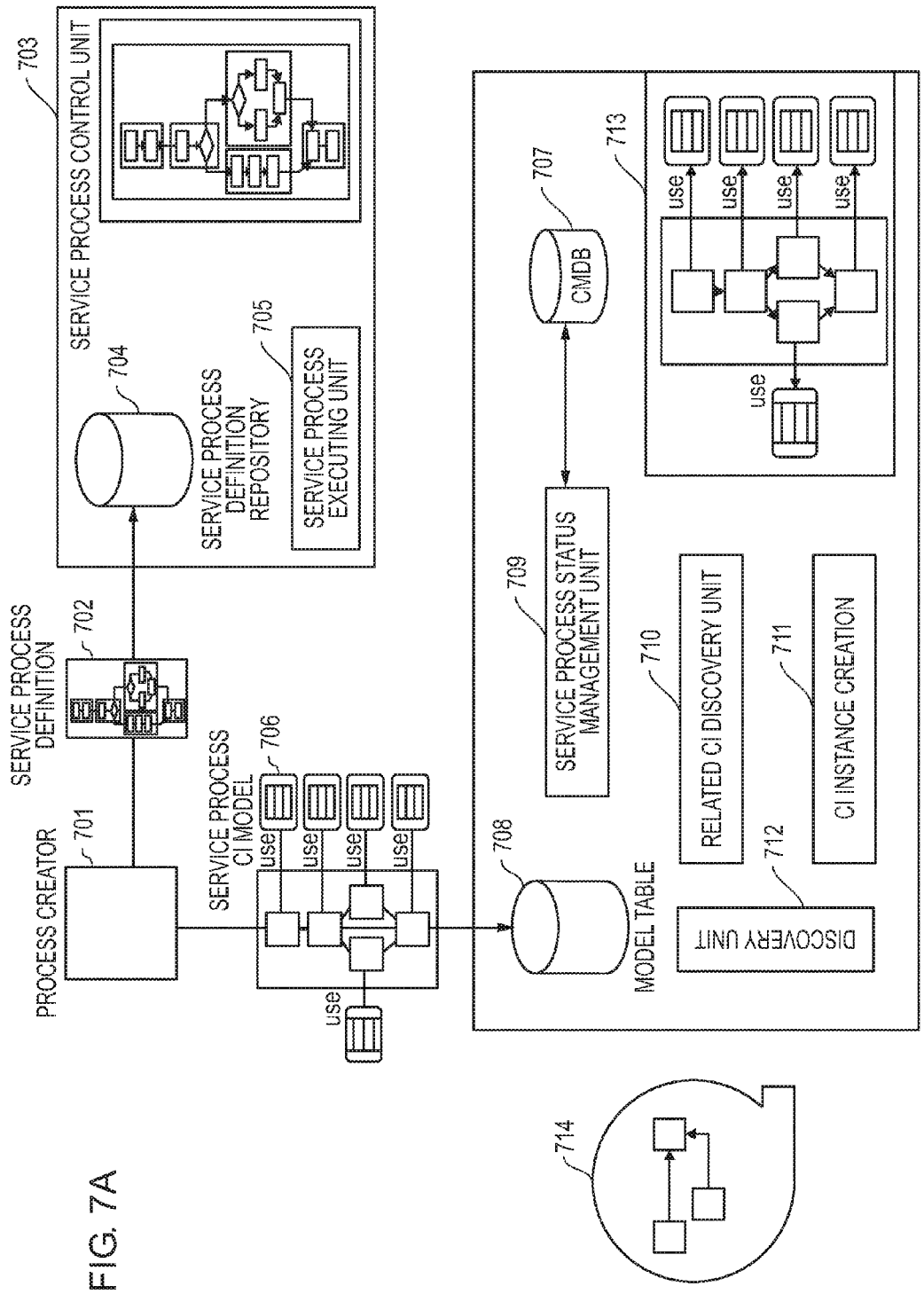
FIG. 7A shows an example of a system according to an embodiment of the present invention.

FIGS. 7A to 7D show an example of a system according to an embodiment of the present invention. FIG. 7A shows that the system includes a service process control unit (703), a service process definition repository (704), a service process executing unit (705), a CMDB (707), a model table (708), a service process status management unit (709), a related CI discovery unit (710), a CI instance creating unit (711), and a discovery unit (712).

A service process creator (701) defines a service process and a plurality of service steps included in the service process to create a service process definition (702). The service process creator (701) stores the service process definition (702) in the service process definition repository (704) in the service process control unit (703). The service process definition repository (704) may be connected to the service process control unit (703) via a network. The service process control unit (703) includes the service process executing unit (705) which executes service processes.

The service process creator (701) also creates a CI model of a service process (706) and CI models of a plurality of service steps included in the service process (706). The service process creator (701) stores the CI models in the model table (708).

Figure 7B:
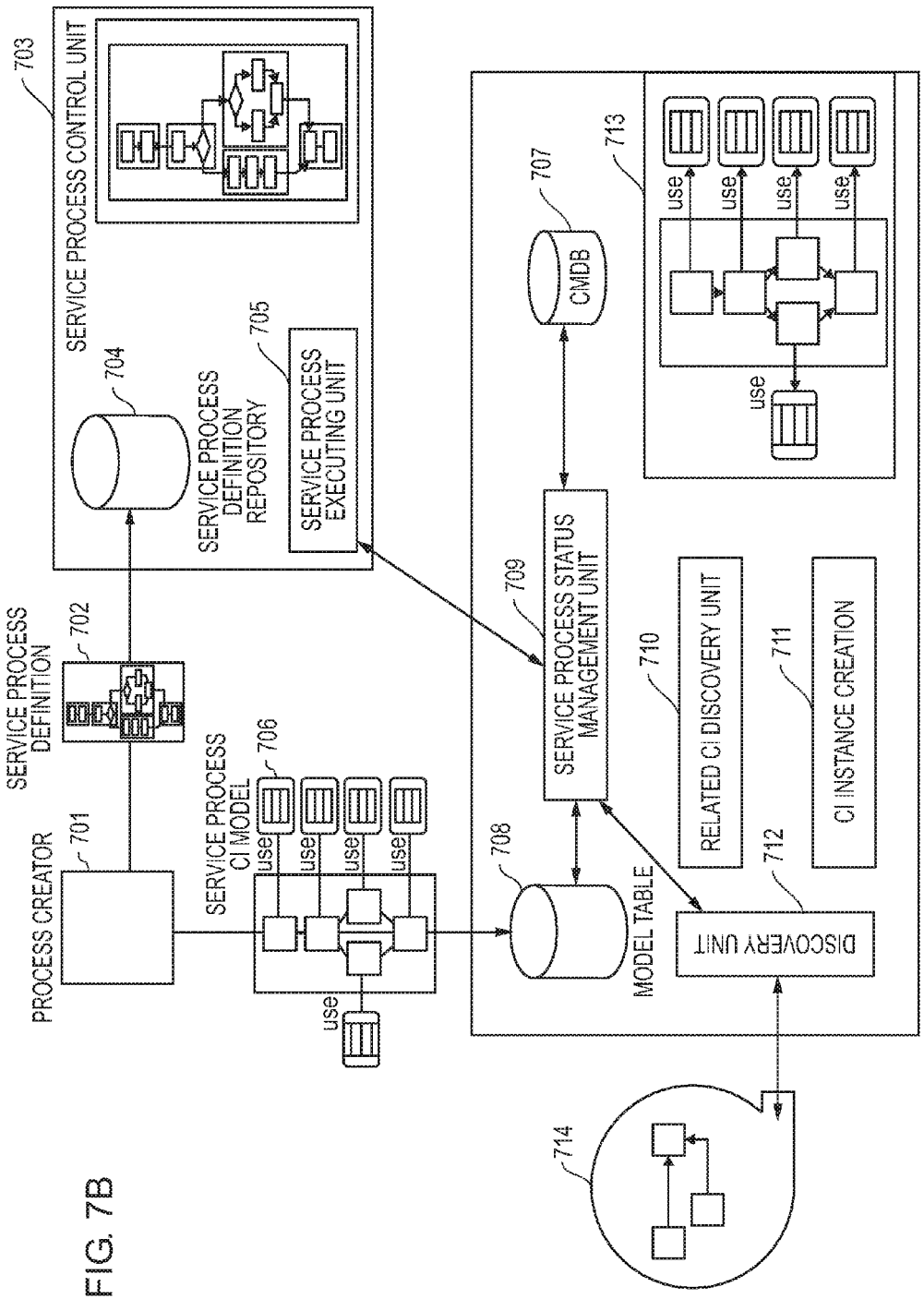
FIG. 7B shows the relationships between a service process status management unit and other components in an embodiment of the present invention.

FIG. 7B shows the relationships between the service process status management unit (709) and other components in an embodiment of the present invention. The service process status management unit (709) obtains the status of a service process and updates attribute values and relation values of a corresponding service process CI instance and corresponding service step CI instances stored in the CMDB (707). This update is performed by, for example, a method for obtaining the status of a service process by performing discovery in an actual environment or a progress management database (not shown) or a method for synchronization with the service process executing unit. After the instantiation of the CI model of a specific service process is completed, the service process status management unit (709) determines whether the CI model of the next service step can be instantiated.

Figure 7C:
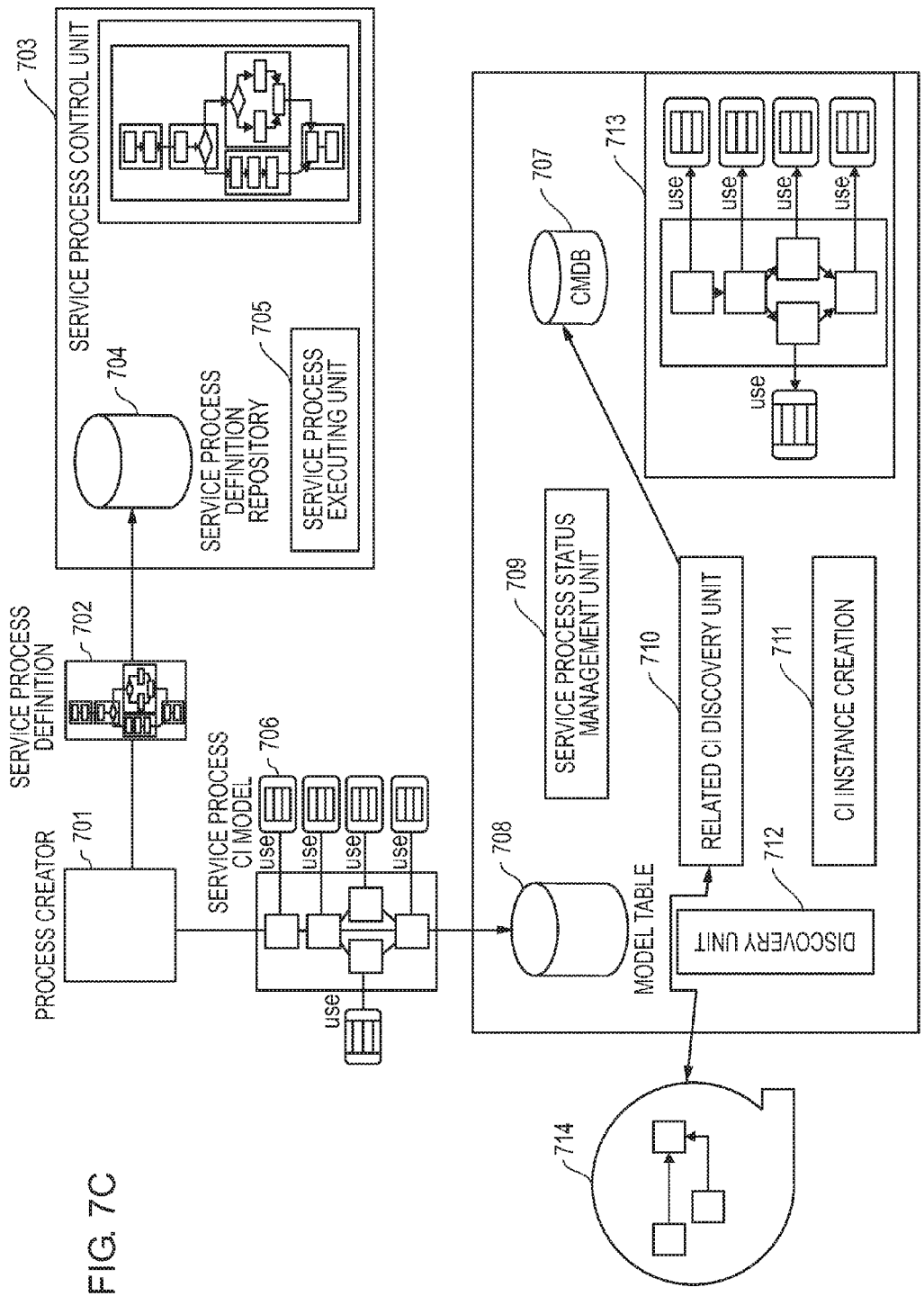
FIG. 7C shows the relationships between a related CI discovery unit and other components in an embodiment of the present invention.

FIG. 7C shows the relationships between the related CI discovery unit (710) and other components in an embodiment of the present invention. Upon instantiation of the CI model of a service step, the related CI discovers unit (710) detects a resource to execute the service step (i.e., a related CI) and creates the relation between the detected resource and the service step. This detection may be carried out by performing discovery in the CMDB (707) or managed objects (714) such as actual devices managed by the related CI discovery unit. The related CI discovery unit (710) may instantiate the CI model of the related CI from information on the detected related CI. Alternatively, the related CI discovery unit (710) may request the CI instance creating unit (711) to instantiate the CI model of the related CI from information on the detected related CI.

Figure 7D:
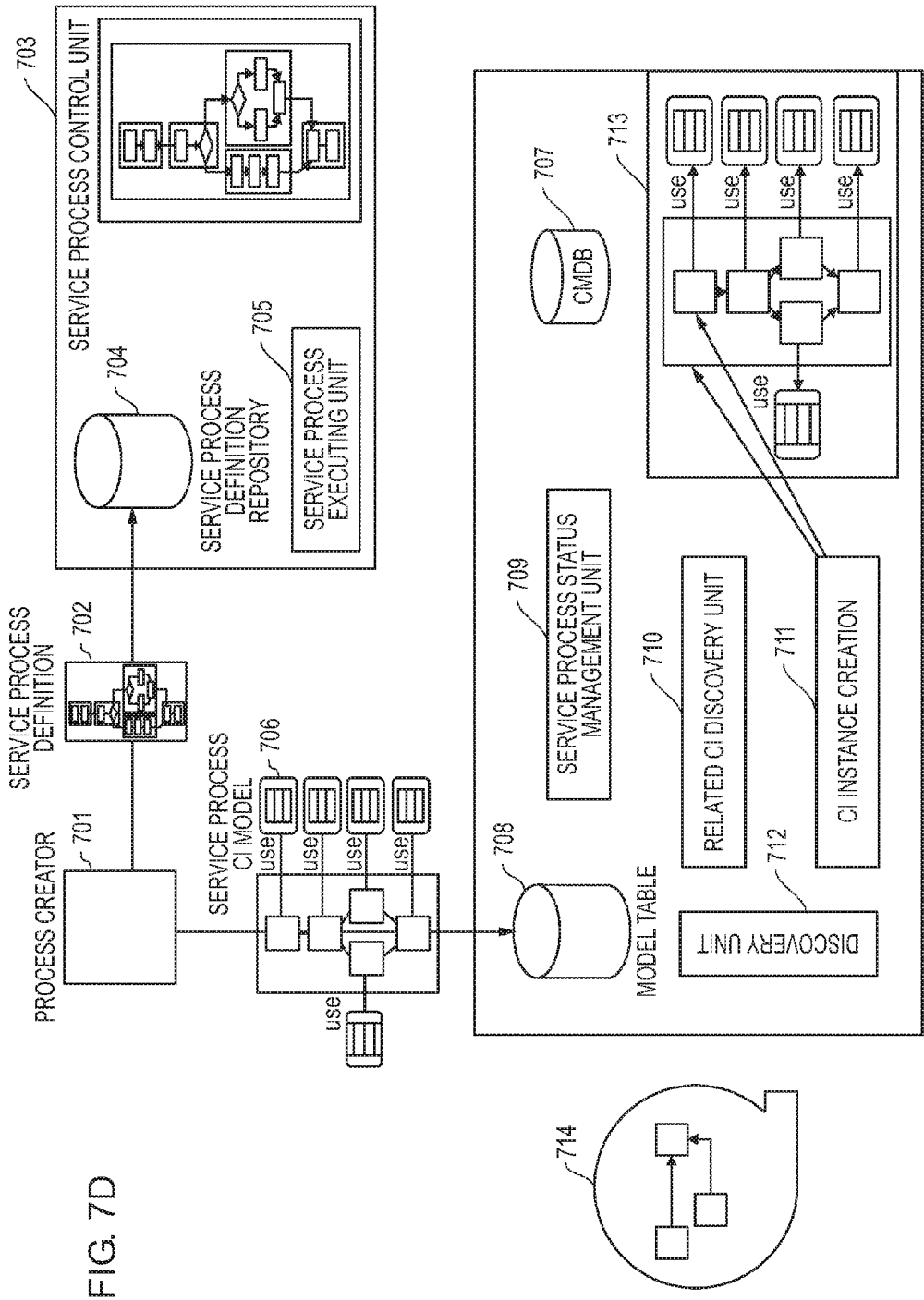
FIG. 7D shows the relationships between a CI instance creating unit and other components in an embodiment of the present invention.

FIG. 7D shows the relationships between the CI instance creating unit (711) and other components in an embodiment of the present invention. Upon execution of a service process, the CI instance creating unit (711) instantiates the CI model of the service process. The CI instance creating unit (711) instantiates the CI model of a service step in response to the status of the service step. In this case, upon the service process status management unit's confirming the execution of a service process, the CI instance creating unit (711) may instantiate the CI models of the CIs of the service process and the first service step.

FIG. 8 is a flowchart showing the instantiations of the CI models of a service process and service steps in an embodiment of the present invention. The service process status management unit (709) confirms a service request (801). In response to the service request the service process status management unit requests the CI instance creating unit (711) to instantiate the CI model of a corresponding service process.

The CI instance creating unit (711) instantiates the CI model of the service process (802). The CI instance creating unit (711) starts to instantiate the CI model of the first service step in response to the instantiation of the CI model of the service process (803). The CI instance creating unit (711) determines, in accordance with "conditions for instantiating its own CI" defined in the CI model, whether any resource to execute the service process (i.e., any related CI) exists. When a related CI exists, the CI instance creating unit (711) requests the related CI discovery unit (710) to detect the related CI (805). The CI instance creating unit (711) instantiates the CI model of the related CI from information on the detected related CI (806). Alternatively, the related CI discovery unit (710) may request the CI instance creating unit (711) to instantiate the CI model of the related CI from the information on the detected related CI. With this instantiation, the CI instance of the related CI is created. When no related CI exists, the process proceeds to the next step (807).

When a related CI exists, the CI instance creating unit (711) completes the instantiation of the CI model of the service step using the CI instance of the related CI (807). The CI instance creating unit (711) indicates to the service process status management unit that the instantiation of the CI model of the service step has been completed.

The service process status management unit repeats the instantiation of the next service step in accordance with conditions defined in "timing of instantiation" of the CI model of the next service step (808).

Figure 9A:
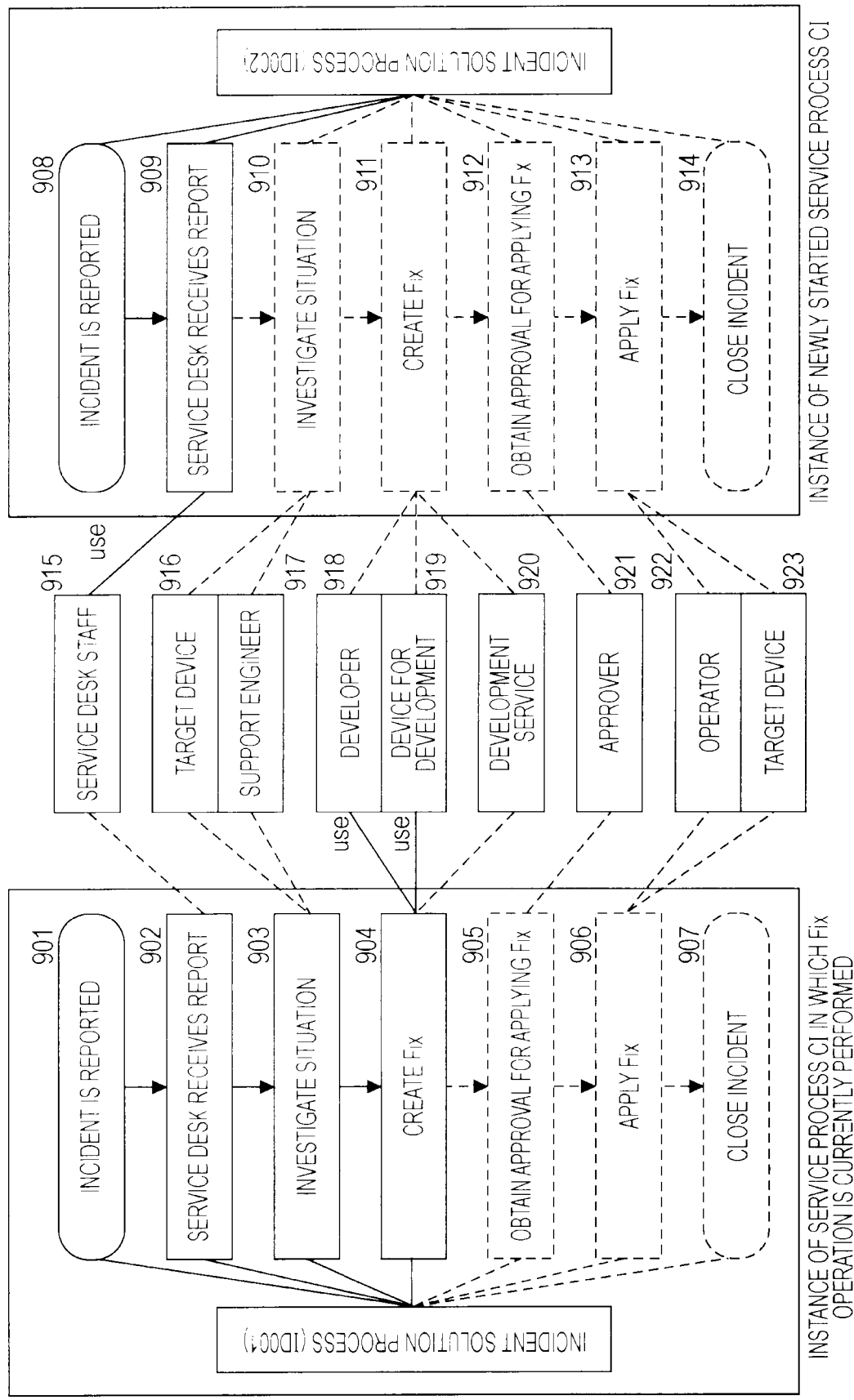
FIG. 9A shows the instantiations of the CI models of service steps included in an incident solution process that is an embodiment of the present invention.

FIGS. 9A to 9F shoes the instantiations of the CI models of service steps included in an incident solution process that is an embodiment of the present invention. FIG. 9A shows an incident solution process (ID001) and service steps (901 to 907) included in the solution process (ID001).

The identifier of the incident solution process (ID001) is ID001. The incident solution process (ID001) is a service process in which an operation is currently performed. The service steps in the incident solution process (ID001) include "incident is reported" (901), "service desk receives report" (902), "investigate situation" (903), "create Fix" (904), "obtain approval for applying Fix" (905), "apply Fix" (906), and "close incident" (907).

The service step 902 has a relation faith a configuration item "service desk staff" (915). The service step 903 has relations with configuration items "target device" (916) and "support engineer" (917). The service step 904 has relations with configuration items "developer" (918), "device for development" (919), and "development service" (920). The service step 905 has a relation with a configuration item "approver" (921). The service step 906 has relations with configuration items "operator" (922) and "target device" (923).

In FIG. 9A, the CI instance creating unit (711) has already instantiated the CI model of the incident solution process (ID001) and the CI models of the service steps (901 to 903) in the incident solution process (ID001) (solid lines). In the incident solution process (ID001), the CI instance creating unit (711) is instantiating the CI model of the service step "create Fix" (904). The relation "use" currently exists between the service step 904 and the developer (918) and the device for development (919). The CI instance creating unit (711) has not yet instantiated the CI models of the service steps (905 to 907) in the incident solution process (ID001) (broken lines).

FIG. 9A further shows an incident solution process (ID002) and service steps (908 to 914) included in the solution process (ID002). The identifier of the incident solution process (ID002) is ID002. The incident solution process (ID002) is an incident solution process separate from the incident solution process (ID001) and is a service process that has been newly started.

The service steps in the incident solution process (ID002) include "incident is reported" (908), "service desk receives report" (909), "investigate situation" (910), "create Fix" (911), "obtain approval for applying Fix" (912), "apply Fix" (913), and "close incident" (914).

The service step 909 has a relation with the configuration item "service desk staff" (915). The service step 910 has relations with the configuration items "target device" (916) and "support engineer" (917). The service step 911 has relations with the configuration items "developer" (918), "device for development" (919), and "development service" (920). The service step 912 has a relation with the configuration item "approver" (921). The service step 913 has relations with the configuration items "operator" (922) and "target device" (923).

In FIG. 9A, the CI instance creating unit (711) has already instantiated the CI model of the incident solution process (ID002) and the CI model of the service step (908) in the incident solution process (ID002) (solid lines). Moreover, in the incident solution process (ID002), the CI instance creating unit (711) is instantiating the CI model of the service step "service desk receives report" (909). The relation "use" currently exists between the service step 909 and the service desk staff (915). The CI instance creating unit (711) has not yet instantiated the CI models of the service steps (910 to 914) in the incident solution process (ID002) (broken lines).

Figure 9B:
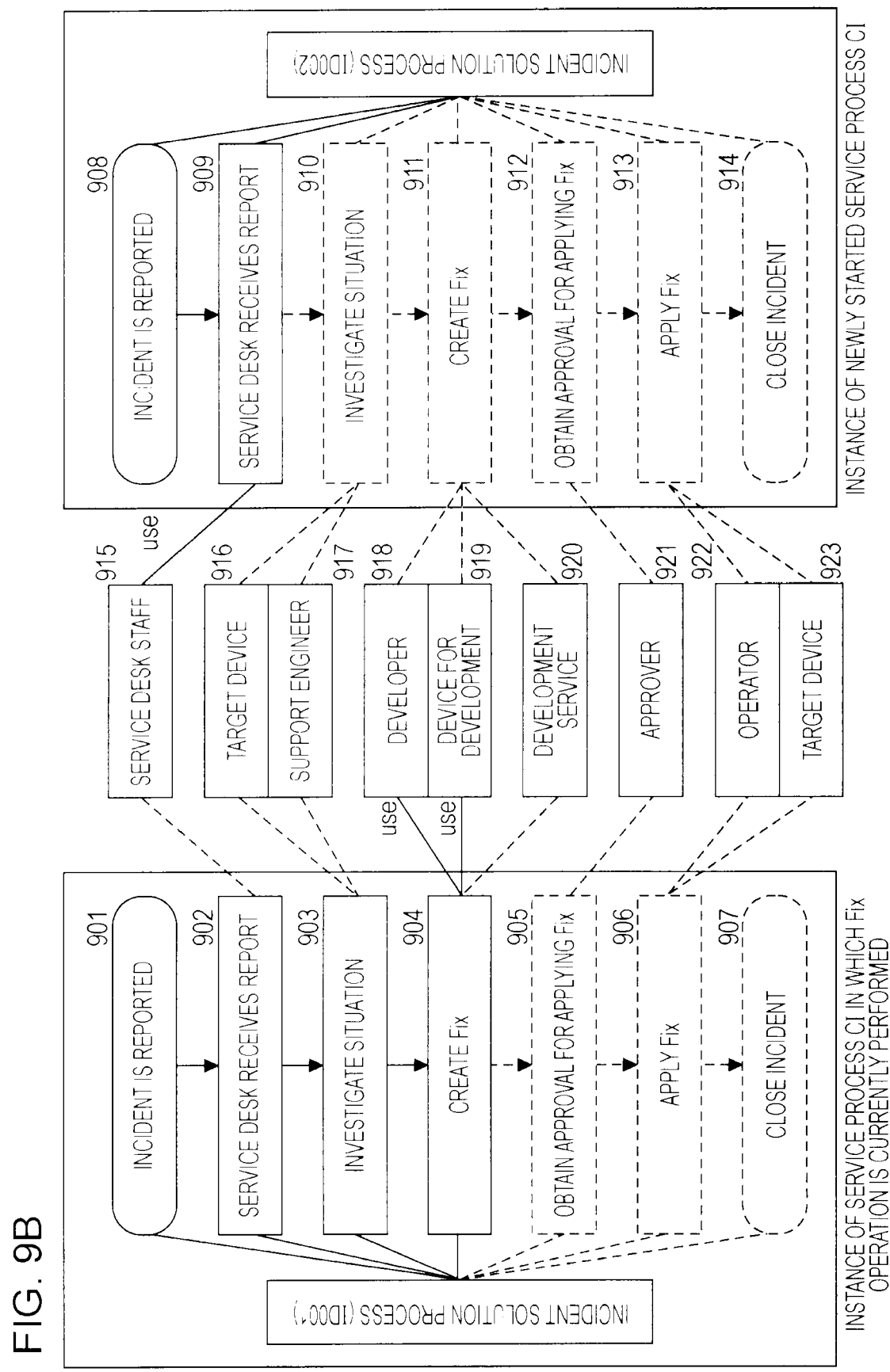
FIG. 9B shows the instantiations of the CI models of service steps included in an incident solution process that is an embodiment of the present invention.

FIG. 9B shows that the CI instance creating unit (711) is currently instantiating the CI model of the service step (909) in the incident solution process (ID002). In the instantiation of the CI model of the preceding service step (908), the CI instance creating unit (711) determines the conditions for instantiating the CI of the CI model of the following service step (909). The target device (916) and the problem type are specified as "conditions for instantiating its own CI" of the CI model. The CI instance creating unit (711) may define the conditions for instantiating the following CI in a model that is the same as the CI model of the service step (908). Alternatively, the CI instance creating unit (711) may define the conditions for instantiating the following CI in a table separate front the CI model of the service step (908).

Figure 9C:
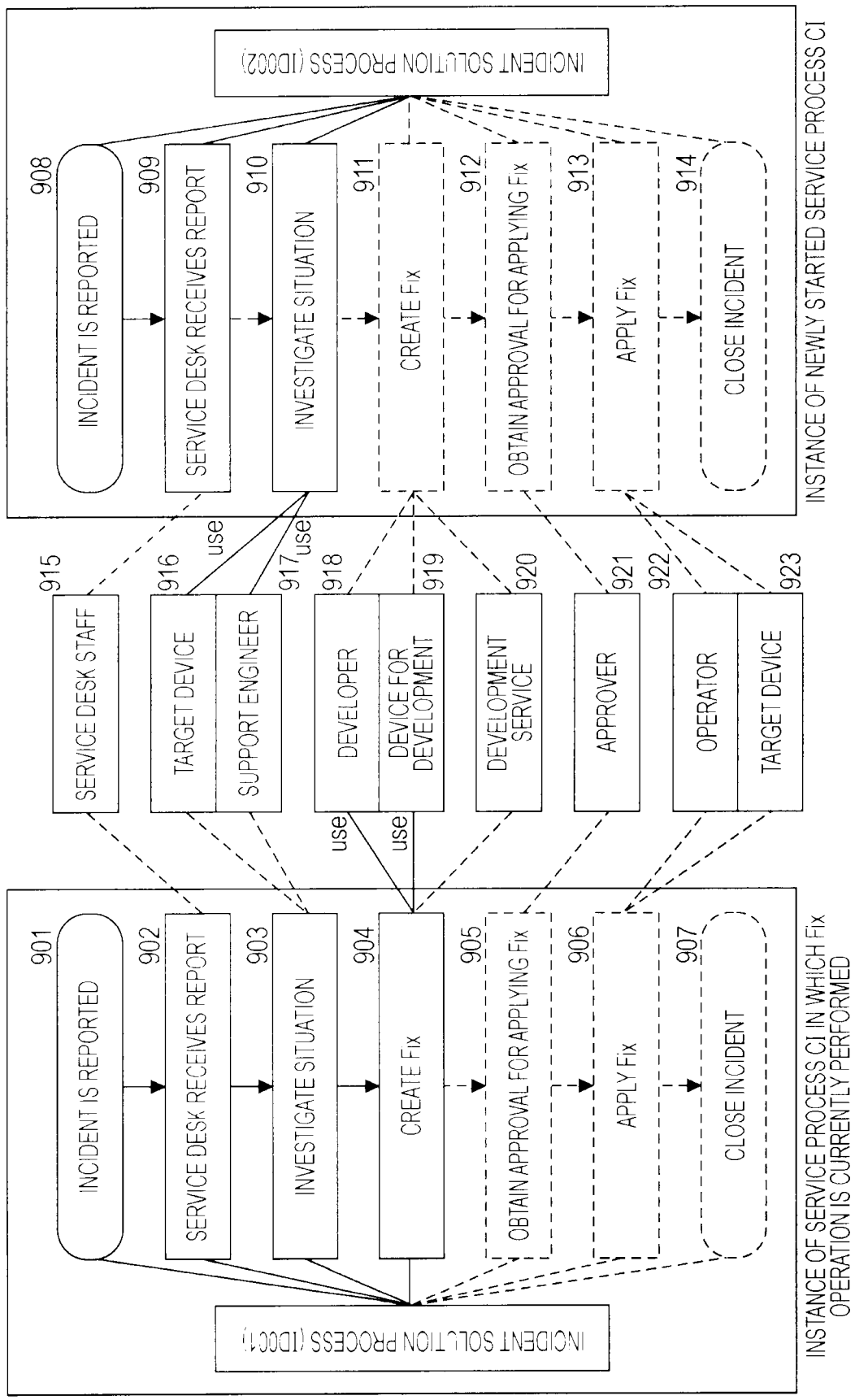
FIG. 9C shows the instantiations of the CI models of service steps included in an incident solution process that is an embodiment of the present invention.

FIG. 9C shows that, when the CI instance creating unit (711) instantiates the CI model of the following service step (909) in the incident solution process (ID002), the CI instance creating unit (711) refers to the aforementioned conditions for instantiating the following CI. The CI instance creating unit (711) instantiates the CI model of the following service step (909) in accordance with the conditions for instantiating the CI model of the following service step and the referred conditions for instantiation the following CI.

Figure 9D:
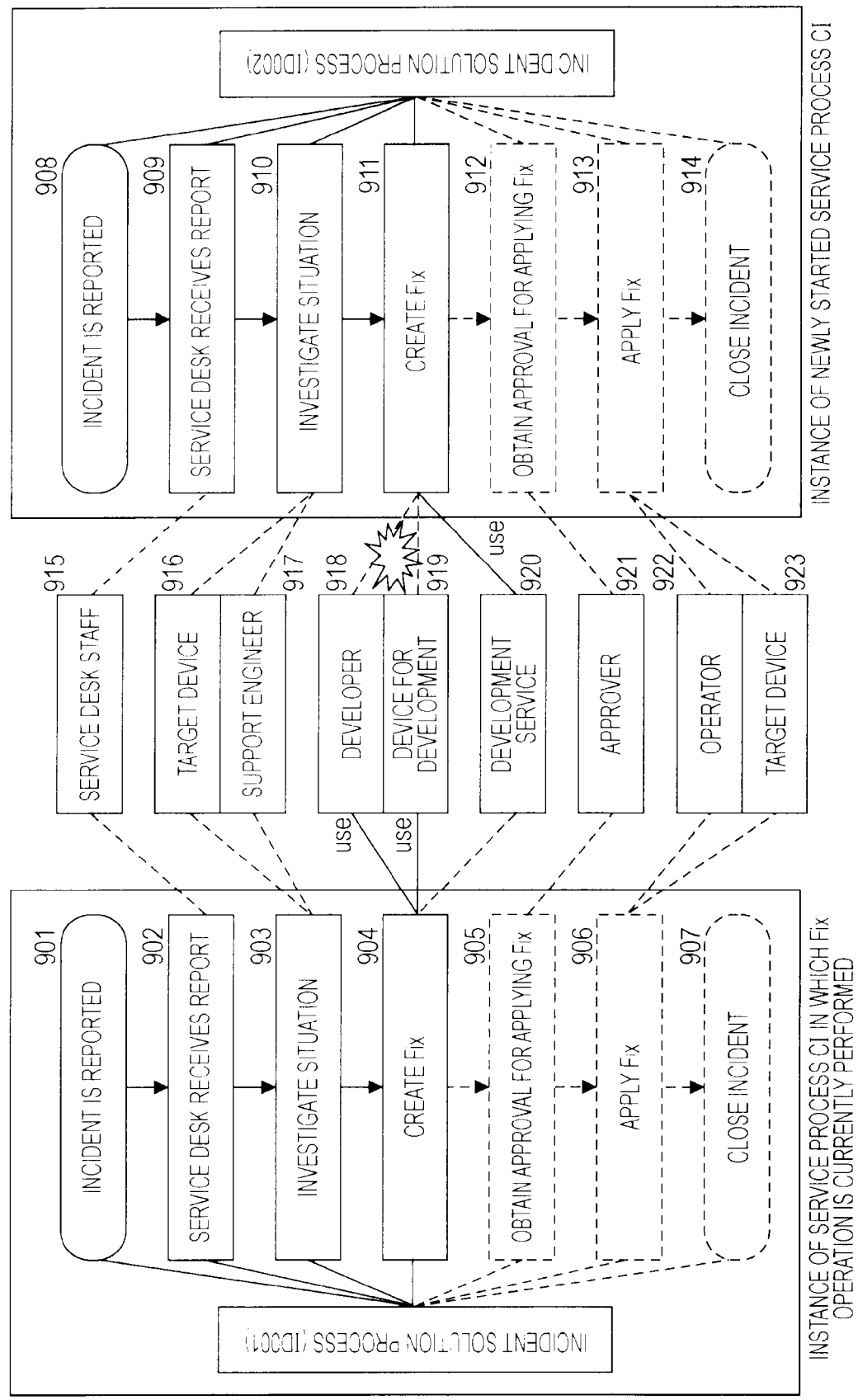
FIG. 9D shows the instantiations of the CI models of service steps included in an incident solution process that is an embodiment of the present invention.

FIG. 9D shows that, when the CI model of the service step (904) in the incident solution process (ID001) and the CI model of the service step (911) in the incident solution process (ID002) are instantiated, related CIs conflict with each other.

The CI model of the service step (904) in the incident solution process (ID001) has relations with the developer (918) and the device for development (919). Similarly, the CI model of the service step (911) in the incident solution process (ID002) has relations with the developer (918) and the device for development (919). Thus, the related CIs to instantiate the CI model of the service step (911) in the incident solution process (ID002), which has been newly started i.e., the developer (918) and the device for development (919), conflict with the related CIs to instantiate the CI model of the service step (904) in the incident solution process (ID001). Thus, when the CI instance creating unit (711) instantiates the CI model of the service step (911) in the incident solution process (ID002), the CI instance creating unit (711) detects other configuration items that provide services equivalent to those of the developer (918) and the device for development (919), for example, another developer and another device for development. The CI instance creating unit (711) instantiates the CI model of the service step (911) using information on the detected other configuration items.

Figure 9E:
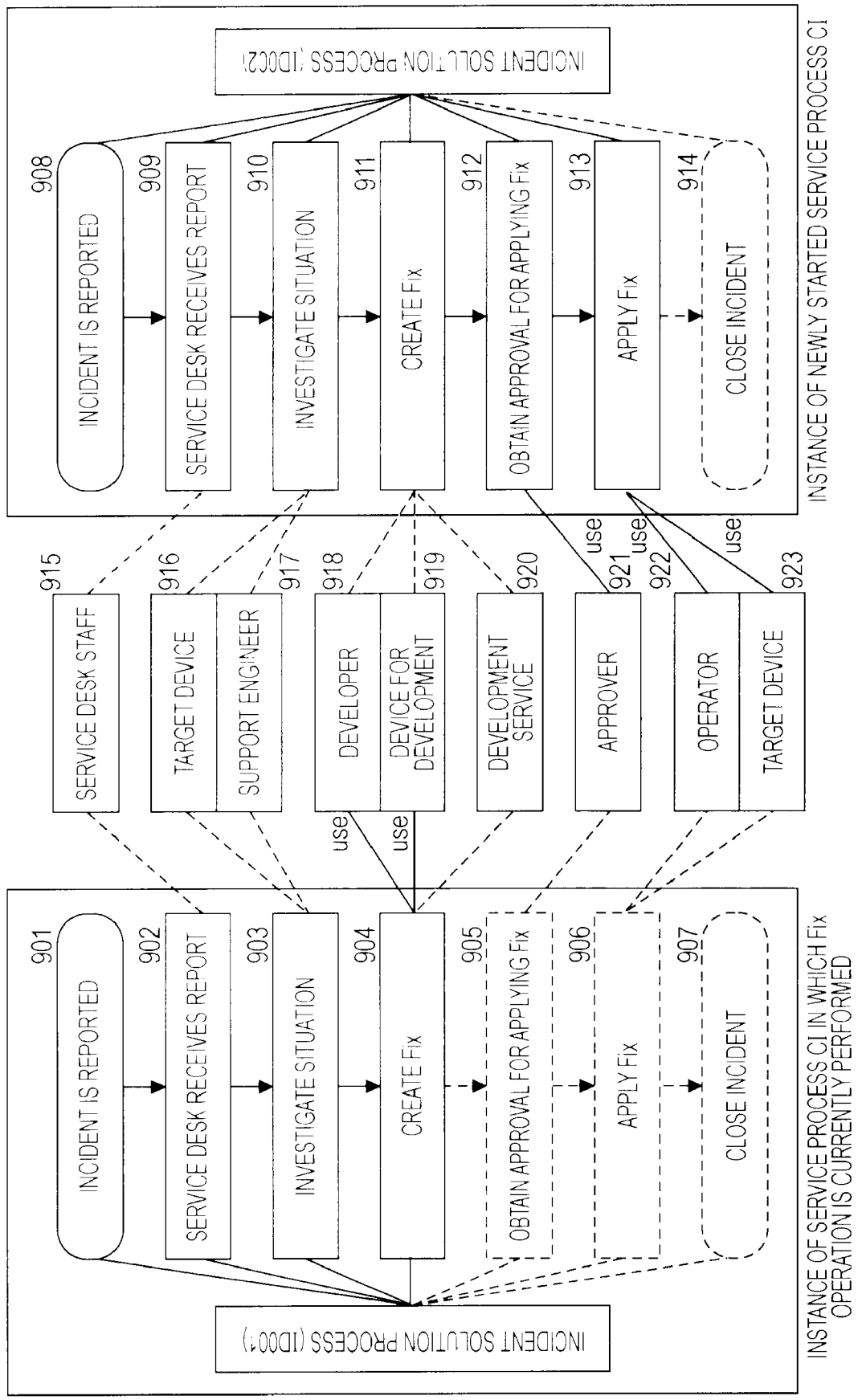
FIG. 9E shows the instantiations of the CI models of service steps included in an incident solution process that is an embodiment of the present invention.

FIG. 9E shows that the CI instance creating unit (711) is currently instantiating the CI models of the service step (912) and the service step (913) in the incident solution process (ID002). The service step (912) is an approval step. While instantiating the CI model of the service step (912) and determining the approver (921) to proceed with approval, the CI instance creating unit (711) instantiates the CI model of the service step (913) following the service step (912). When the CI model of the following service step (913) is instantiated, the related CI discovery unit detects in information on the operator (922) and the target device (923). The CI instance creating unit (711) instantiates the CI model of the service step (913) using the detected information on the operator (929) and the target device (923). In the instantiation, an appropriate operator and an appropriate target device are selected.

Figure 9F:
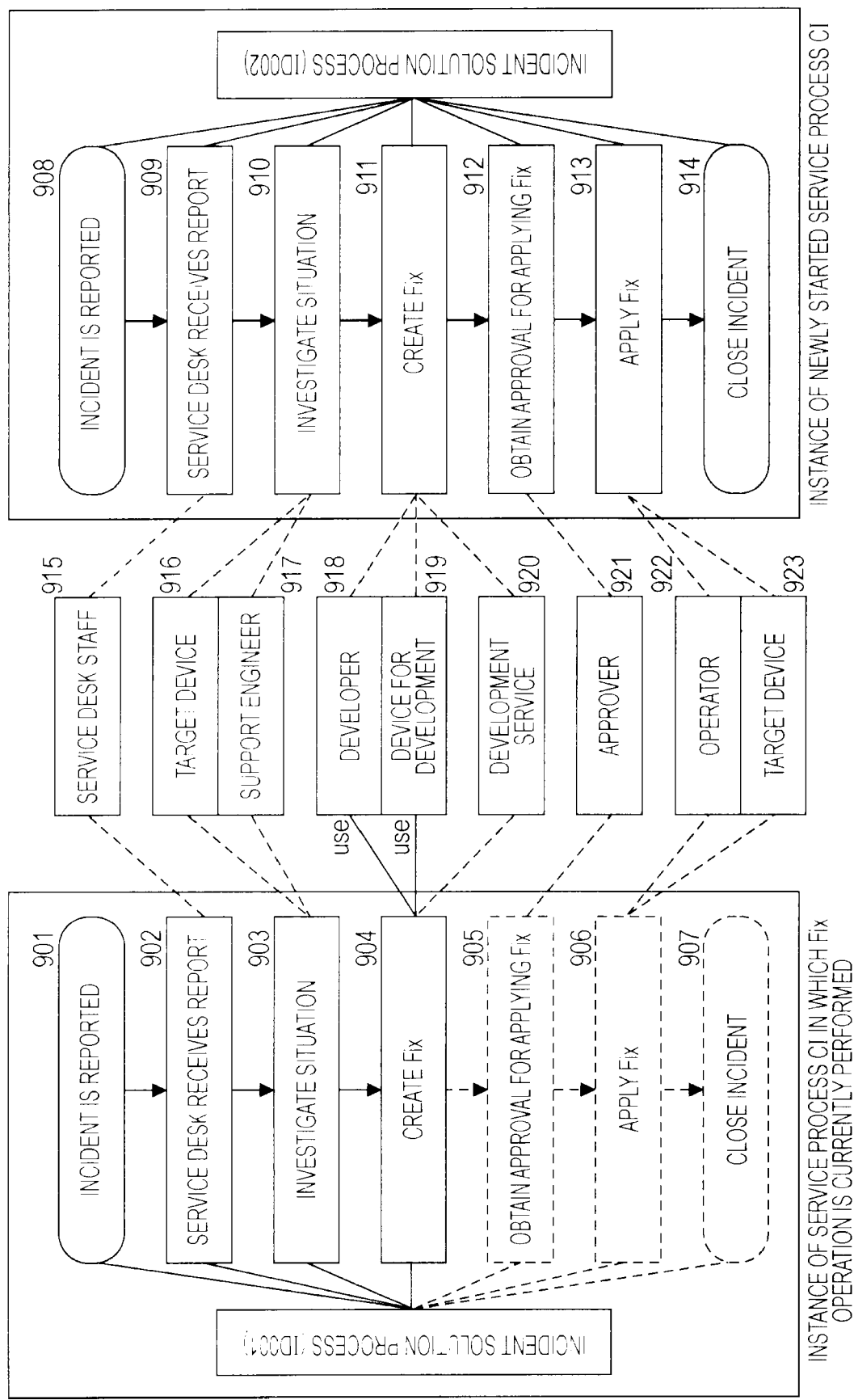
FIG. 9F shows the instantiations of the CI models of service steps included in an incident solution process that is an embodiment of the present invention.

FIG. 9F shows that the CI instance creating unit (711) is currently instantiating the CI model of the service step (914) in the incident solution process (ID002). When the instantiation of the CI model of the service step (914) is completed, the instantiations of the CI models of the service steps in the incident solution process are completed.

A computer used in the computer system in the aforementioned embodiments includes a CPU and a main memory, and these components are connected to a bus. The CPU may be based on the 32-bit or 64-bit architecture. For example, Xeon (trademark) series. Core (trademark) series. Pentium (trademark) series, or Celeron (trademark) series of Intel Corporation, or Phenom (trademark) series or Athlon (trademark) series of Advanced Micro Devices, Inc. can be used as the CPU. A display such as an LCD monitor is connected to the bus via a display controller. The display is used, for the management of the computer system, to display information on the computer connected to a network via a communication line and information on software running on the computer, using an appropriate graphic interface. Moreover, a hard disk or a silicon disk as well as a CD-ROM drive or a DVD drive are connected to the bus via an IDE controller or an SATA controller.

An operating system, programs for providing a Java processing environment such as J2EE, an operational management program for the CMDB, and other programs and pieces of data may optionally be stored in the hard disk so that they can be loaded into the main memory. The operational management program may include Tivoli (trademark) Application Dependency Discovery Manager (TADDM) provided by International Business Machines Corporation.

A keyboard and a mouse may be connected to the bus via a keyboard/mouse controller. The CD-ROM drive or the DVD drive may be used to additionally install programs from a CD-ROM or a DVD into the hard disk as necessary. In some embodiments, the invention may be implemented as program instructions, which may be provided on any computer-usable medium; the medium can be an element suitable to contain, store, communicate, propagate, or transfer the program. Examples of such medium are fixed disks (where the program can be pre-loaded), removable disks, tapes, cards, and the like; for example, the medium may be of the electronic, magnetic, optical, electromagnetic, infrared, or semiconductor type.

Embodiments of the invention may be implemented in any form suitable to be used by or in connection with any data processing system, such as external or resident software, firmware, or microcode (either in object code or in source code). Software modules, which may be used to implement embodiments of the invention, may be structured differently than discussed above and may include additional modules or functions. The memory structures may be of other types, or may be replaced with equivalent entities.

The communication interface may be based on, for example, the Ethernet Protocol and may be connected to the bus via a communication controller. The communication interface plays a role that physically connects the computer to the communication line and provides the network interface layer in the TCP/IP communication protocol of the communication function of the operating system of the computer. In this case, the communication line may be implemented in a wired LAN environment or a wireless LAN environment based on a wireless LAN connection standard such as IEEE 802.11a/b/g/n.

Available network connection units that establish a connection of hardware such as computers are not limited to the aforementioned network switch but may include, for example, a router and a hardware management console. In other words, these units may include a function of, in response to an inquiry using a predetermined command from a computer in which a network operational management program is installed, returning the configuration information of computers connected to these units, such as IP addresses and MAC addresses. Each of the network switch and the router may include an Address Resolution Protocol (ARP) table that includes a list of pairs of the IP addresses of computers connected to each of the network switch and the router and corresponding MAC addresses for the ARP and may include a function of returning the content of the ARP table in response to an inquiry using a predetermined command. The hardware management console can return the configuration information of computers that is more detailed than the ARP table.

The aforementioned hardware management console may be connected to the computer. The hardware management console may include a function of logically partitioning a computer into a plurality of partitions by means of logical partitioning (LPAR) so as to cause different OSs such as Windows (trademark) and Linux (trademark) to run in the individual partitions using VMware. The detailed information on the individual logical partitions of the computer operating using LPAR and VMware can be obtained by sending an inquiry to the hardware management console.

While the present invention has been described on the basis of one or more embodiments, the content described in the embodiments is just an example of the invention, and it will be apparent to those skilled in the art that various modifications can be conceived without departing from the present invention. For example, instead of the CMDB and CIs stored in the CMDB, another type of database and another type of CI may be used. Moreover, other than Java, any computer development environment in which an API that includes a network management function can be invoked, such as C++ or C#, may be used.

What is claimed is:

1. A computer system for managing a service process comprising:
    a discovery unit for detecting data on a resource for executing one or more service steps included in the service process; and
    a repository for holding, for each of at least one configuration item, a set of data that represents at least one predetermined attribute of the configuration item and a relation between the at least one configuration item and a second configuration item,
    wherein the set of data includes:
        data created using a first configuration item model in which a particular service process is defined as a first single configuration item; and
    data created from the detected data using a second configuration item model in which one or more particular service steps are defined as a second single configuration item,
        the first configuration item model including a first attribute for identifying the second configuration item model associated with the particular service step to be executed in response to the service process starting, and
        the second configuration item model including a condition attribute designating a condition for creating data using the second configuration item model and a timing attribute designating timing of creating data using the second configuration item model.

2. The computer system of claim 1 wherein:
    the first configuration item model represents at least one first predetermined attribute of the particular service process and a first relation between the particular service process and one or more of the particular service steps; and
    the second configuration item model represents at least one second predetermined attribute of the particular service steps and a second relation between the particular service steps and a particular resource to execute the particular service steps.

3. The computer system of claim 1, wherein the second configuration item model defines a plurality of the particular service steps that use the same resource as a single configuration item.

4. The computer system of claim 1, further comprising a data creating unit that creates the set of data for the at least one configuration item.

5. The computer system of claim 1, wherein the discovery unit further detects data on a resource to execute the service process, and the data created using the first configuration item model are data created from the detected data.

6. The computer system of claim 1, further comprising a data updating unit that updates the set of data using the detected data.

7. The computer system of claim 1, wherein the set of data comprises data that represents at least one predetermined attribute of the resource and a relation between the resource and a third configuration item.

8. The computer system of claim 1, wherein the resource is selected from at least one of the group consisting of a staff, a place, goods, and a service.

9. A computer system for managing a service process comprising:
   a discovery unit for detecting data on a resource for executing one or more service steps included in the service process;
   a repository for holding, for each of at least one configuration item, a set of data that represents at least one predetermined attribute of the configuration item and a relation between the at least one configuration item and a second configuration item; and
   a recording unit that stores models that are used to create data from the detected data, wherein the models include a first configuration item model in which a particular service process is defined as a first single configuration item and a second configuration item model in which one or more particular service steps are defined as a second single configuration item,
   the first configuration item model including a first attribute for identifying the second configuration item model associated with the particular service step to be executed in response to the service process starting, and
   the second configuration item model including a condition attribute designating a condition for creating data using the second configuration item model and a timing attribute designating timing of creating data using the second configuration item model.

10. A computer-implemented method for managing a service process, the method comprising:
   providing a repository that holds, for each of at least one configuration item, a set of data that represents at least one predetermined attribute of the configuration item and a relation between the configuration item and a second configuration item;
   detecting data on a resource for executing at least one of a plurality of service steps of the service process;
   creating, in response to a particular service process starting, data using a first configuration item model in which the particular service process is defined as a single configuration item, the first configuration item model being stored in the repository; and
   creating data from the detected data using a second configuration item model in which one or more particular service steps are defined as a single configuration item, the second configuration item model being stored in the repository,
   the first configuration item model including a first attribute for identifying the second configuration item model associated with the particular service step to be executed in response to the service process starting, and
   the second configuration item model including a condition attribute designating a condition for creating data using the second configuration item model and a timing attribute designating timing of creating data using the second configuration item model.

11. The method of claim 10, wherein detecting data is performed in at least one of the group consisting of the repository and a recording unit connected to the computer system that stores data on resources.

12. The method of claim 10, further comprising:
   creating, from the detected data, the set of data that represents the at least one predetermined attribute of the configuration item and the relation between the configuration item and the second configuration item; and
   storing the created set of data in the repository.

13. The method of claim 10, further comprising:
   determining whether the set of data in the repository relates to the detected data;
   updating, upon the set of data in the repository relating to the detected data, an attribute value of the stored set of data with an attribute value of the detected data and a relation value of the stored set of data with a relation value of the detected data; and
   creating, upon the set of data in the repository failing to relate to the detected data, a new set of data from the detected data.

14. The method of claim 10, wherein the first configuration item model represents at least one first predetermined attribute of the particular service process and a first relation between the particular service process and one or more of the particular service steps, and the second configuration item model represents at least one second predetermined attribute of the particular service steps and a relation with a particular resource for executing the particular service steps.

15. The method of claim 10, wherein creating data using the second configuration item model comprises identifying, on the basis of the attribute for identifying the second configuration item model, a service step for which data needs to be created.

16. The method of claim 10, wherein the condition in a particular second configuration item model of a particular service step out of the plurality of service steps includes a condition of a following step, the method further comprising determining the condition of the following step before the particular service step is completed.

17. The method of claim 10, wherein:
   upon the particular service step being the first service step out of the plurality of service steps, the timing is after data is created using the first configuration item model; and
   upon the particular service step failing to be the first service step out of the plurality of service steps, the timing is at least one selected from the group consisting of after creation of data regarding a service step preceding the particular service step and after completion of the service step preceding the particular service step.

18. A computer-implemented method for managing a service process, the method comprising:
   providing a repository that holds, for each of at least one configuration item, a set of data that represents at least one predetermined attribute of the configuration item and a relation between the configuration item and a second configuration item;
   creating, in response to a particular service process starting, data using a first configuration item model in which the particular service process is defined as a single configuration item, the first configuration item model being stored in the repository; and creating data using a second configuration item model in which one or more particular service steps are defined as a single configuration item, the second configuration item model being stored in the repository, wherein creating data using the second configuration item model comprises:

detecting data on a resource for executing the particular service steps;

creating data from the detected data;

storing the created data in the repository, the first configuration item model including a first attribute for identifying the second configuration item model associated with the particular service step to be executed in response to the service process starting, and the second configuration item model including a condition attribute designating a condition for creating data using the second configuration item model and a timing attribute designating timing of creating data using the second configuration item model.

19. A computer program product for managing a service process comprising:

a computer readable storage medium having computer usable program code embodied therewith, the computer usable program code comprising:

computer program instructions for providing a repository that holds, for each of at least one configuration item, a set of data that represents at least one predetermined attribute of the configuration item and a relation between the configuration item and a second configuration item;

computer program instructions for detecting data on a resource for executing one or more service steps included in the service process;

computer program instructions for creating, in response to a particular service process starting, data using a first configuration item model in which the particular service process is defined as a single configuration item, the first configuration item model being stored in the repository; and computer program instructions for creating data from the detected data using a second configuration item model in which one or more particular service steps are defined as a single configuration item, the second configuration item model being stored in the repository, the first configuration item model including a first attribute for identifying the second configuration item model associated with the particular service step to be executed in response to the service process starting, and the second configuration item model including a condition attribute designating a condition for creating data using the second configuration item model and a timing attribute designating timing of creating data using the second configuration item model.

* * * * *